United States Patent
Güralp et al.

(10) Patent No.: US 12,196,602 B2
(45) Date of Patent: Jan. 14, 2025

(54) INFRASOUND DETECTOR WITH FORCE TRANSDUCER FOR NEGATIVE FEEDBACK OR CALIBRATION

(71) Applicant: Gaiacode LTD, Silchester Reading (GB)

(72) Inventors: Cansun Güralp, Silchester Reading (GB); Cem Cansun Thomas Güralp, Silchester Reading (GB)

(73) Assignee: Gaiacode LTD, Silchester Reading (GB)

( * ) Notice: Subject to any disclaimer, the term of this patent is extended or adjusted under 35 U.S.C. 154(b) by 440 days.

(21) Appl. No.: 17/423,919

(22) PCT Filed: Jan. 17, 2020

(86) PCT No.: PCT/GB2020/050095
§ 371 (c)(1),
(2) Date: Jul. 19, 2021

(87) PCT Pub. No.: WO2020/148547
PCT Pub. Date: Jul. 23, 2020

(65) Prior Publication Data
US 2022/0090957 A1    Mar. 24, 2022

(30) Foreign Application Priority Data
Jan. 18, 2019 (GB) .................................. 1900719

(51) Int. Cl.
*G01H 3/10* (2006.01)
*G01H 3/00* (2006.01)
(Continued)

(52) U.S. Cl.
CPC ............... *G01H 3/10* (2013.01); *G01H 3/005* (2013.01); *G01H 11/00* (2013.01); *G21J 5/00* (2013.01)

(58) Field of Classification Search
CPC ........ G01H 11/00; G01H 17/00; G01H 3/005; G01H 3/10; G01L 27/00–005;
(Continued)

(56) References Cited

U.S. PATENT DOCUMENTS 4,908,536 A    3/1990  Hudimac
4,991,145 A *  2/1991  Goldstein .......... G08B 13/1681
                                                 307/116
(Continued)

FOREIGN PATENT DOCUMENTS

EP    0357539      3/1990
GB    2123553 A *  2/1984 ............. G01H 3/005
(Continued)

OTHER PUBLICATIONS

France Atomic Energy Commission Military Applications Division (Cea/Dam), MB2000 and MB2005 Microbarometers, webpage <https://www-dase.cea.fr/public/dossiers_thematiques/microbarometres/description_en.html>, retrieved from Internet Archive (Year: 2017).*
(Continued)

*Primary Examiner* — David L Singer

(57) ABSTRACT

An infrasound detector for determining illicit nuclear explosions, comprising an infrasound transducer, signal feedback path, and feedback force transducer. The infrasound transducer is configured to transduce an infrasound signal to an electrical signal. The signal feedback path is arranged to feed a feedback signal from the infrasound transducer to a feedback force transducer. The feedback force transducer is configured to transduce a feedback electrical signal to a feedback force signal and arranged to provide the feedback force signal as input to the infrasound transducer, allowing seismic noise and/or environmental noise to be removed. The infrasound detector also allows for in-situ calibrations.

17 Claims, 14 Drawing Sheets

(51) Int. Cl.
*G01H 11/00* (2006.01)
*G21J 5/00* (2006.01)

(58) Field of Classification Search
CPC .............................. G01L 27/002; G01V 13/00;
G10K 2210/129; G21J 5/00
See application file for complete search history.

(56) References Cited

U.S. PATENT DOCUMENTS

| | | | | |
|---|---|---|---|---|
| 5,146,780 | A * | 9/1992 | Zuckerwar | ............ H04R 29/004 73/571 |
| 6,122,385 | A | 9/2000 | Konno et al. | |
| 2005/0257598 | A1* | 11/2005 | Alcoverro | ............. G01L 27/005 73/1.57 |
| 2008/0045805 | A1* | 2/2008 | Sarel | ...................... A61B 5/164 600/300 |
| 2009/0022341 | A1* | 1/2009 | Shams | ................... H04R 29/00 381/174 |
| 2014/0140179 | A1 | 5/2014 | He et al. | |
| 2014/0260646 | A1* | 9/2014 | Rothman | ................. G01V 1/36 73/719 |
| 2015/0160090 | A1* | 6/2015 | Iseberg | .................. H04R 25/30 600/587 |
| 2015/0160333 | A1 | 6/2015 | Kim et al. | |
| 2016/0195445 | A1* | 7/2016 | Olivier | ................... G01L 9/0039 73/384 |
| 2016/0225365 | A1* | 8/2016 | Dooley | .................. G05D 19/02 |
| 2018/0003184 | A1* | 1/2018 | Dooley | ................. F04D 27/002 |
| 2019/0086256 | A1* | 3/2019 | Grimmett | ................ G01H 3/00 |

FOREIGN PATENT DOCUMENTS

| | | | | |
|---|---|---|---|---|
| GB | | 2291196 | 1/1996 | |
| JP | | 11-289591 | 10/1999 | |
| JP | | 2011015237 A | * 1/2011 | ............. H04R 23/00 |
| WO | | WO 95/24658 | 9/1995 | |
| WO | | WO 2020/148547 | 7/2020 | |

OTHER PUBLICATIONS

Kadirvel et al, Design, Modeling and Simulation of a Closed-Loop Controller for a Dual Backplate MEMS Capacitive Microphone, IEEE Sensors 2007 Conference (Year: 2007).*

Scientific and Technical Center "Geophysical Measurements" LLC, Differential microbarometer ISGM-03M, webpage <http://ntcgi.ru/products/differential-mikrobarometr-isgm-03m.php>, retrieved from Internet Archive, includes Google Translation (Year: 2015).*

Larionov, Complex atmospheric-lithospheric observations of acoustic emission at «Karymshina» site in Kamchatka, E3S Web of Conferences 20, 02006 (2017) DOI: 10.1051/e3sconf/20172002006 Solar-Terrestrial Relations and Physics of Earthquake Precursors (Year: 2017).*

International Search Report and the Written Opinion Dated Apr. 22, 2020 From the International Searching Authority Re. Application No. PCT/GB2020/050095. (18 Pages).

Patents Act 1977: Search Report Under Section 17(5) Dated Jul. 16, 2019 From the Intellectual Property Office of the United Kingdom of Great Britain Re. Application No. GB 1900719.4. (3 Pages).

Christie et al. "Detection of Nuclear Explosions Using Infrasound Techniques", Onshore Energy Security Program OESP View Project, Lithospheric Sturcutre Through the Use of Receiver-Based Imaging Techniques in Seismology, View Project, XP055682989, Air Force Research Laboratory, Final Report, AFRL-RV-HA-TR-2007-1151, p. 1-61, Dec. 1, 2007.

Masterman et al. "A Portable Infrasonic Detection System", NASA, XP055682995, p. 1-13, Aug. 19, 2008.

* cited by examiner

INFRASOUND DETECTOR WITH FORCE TRANSDUCER FOR NEGATIVE FEEDBACK OR CALIBRATION

RELATED APPLICATIONS

This application is a National Phase of PCT Patent Application No. PCT/GB2020/050095 having International filing date of Jan. 17, 2020, which claims the benefit of priority of United Kingdom Patent Application No. 1900719.4 filed on Jan. 18, 2019. The contents of the above applications are all incorporated by reference as if fully set forth herein in their entirety.

FIELD AND BACKGROUND OF THE INVENTION

The present disclosure relates to an infrasound detector. The disclosure is particularly, but not exclusively, applicable to a feedback network control system used within an infrasound detector device.

Detection of nuclear explosions has been an increasingly important task. In particular the signing of Comprehensive Nuclear test ban Treaty CTBT in 1996 and the establishment of the International Monitoring System (IMS) are proof of this.

It is generally agreed and has been identified that the current infrasound systems used for monitoring nuclear explosions have problems that limit detection capability of monitoring stations.

Accurate infrasound systems are important for determining illicit explosion locations.

Infrasound detectors are also used in other applications including volcano monitoring, aircraft activity monitoring, and other atmospheric studies.

The present disclosure seeks to overcome the problems outlined above or at least provide the public with a useful alternative.

SUMMARY OF THE DISCLOSURE

According to a first aspect there is provided an infrasound detector comprising: an infrasound transducer configured to transduce an infrasound signal to an electrical signal; a signal feedback path arranged to feed a feedback signal from the infrasound transducer to a feedback force transducer; and a feedback force transducer configured to transduce a feedback electrical signal to a feedback force signal and arranged to provide the feedback force signal as input to the infrasound transducer.

By providing a feedback force transducer arranged to provide the feedback force signal as input to the infrasound transducer a superior performance of the infrasound detector can be enabled.

For stability and performance the feedback electrical signal may be adapted in the signal feedback path for negative feedback. The feedback electrical signal may be adapted in the signal feedback path such that the feedback force signal opposes the infrasound signal. The feedback electrical signal may be adapted in the signal feedback path such that the feedback force signal matches the infrasound signal in amplitude and is phase shifted by 180°.

The signal feedback path may comprise one or more of the following: a feedback signal amplifier; a feedback signal phase sensitive detector; a feedback signal dominant pole compensator; an analogue to digital converter and/or a digital to analogue converter; a voltage to current converter; an integrator; a proportional integrator; a signal inverter; a low pass filter; a bandpass filter; a biquadratic filter; and one or more parallel feedback paths. These can provide a variety of functionalities. These may be arranged in the forward portion of the feedback path or in the reverse portion of the feedback path. In an example the transfer function of the infrasound detector may be:

$$\frac{\text{Volts}}{\ddot{P}_a}(s) = \frac{G*K*A}{s^2 + 2\gamma w_n s + (GKA\beta + w_n^2)}$$

Where $\ddot{P}_a$ is a second derivative of an infrasound pressure signal; G is an overall detector coefficient; K is a capacitive transducer in Volts/meter; A is an amplifier gain; $w_n$ is a resonant frequency of a diaphragm of a infrasound transducer; β is a feedback gain; and γ is a damping coefficient of a diaphragm of a infrasound transducer.

The infrasound detector may be adapted to provide as outputs one or more electrical signals indicative of the infrasound signal, a first derivative of the infrasound signal, and/or a second derivative of the infrasound signal.

For calibration the infrasound detector may further comprise a calibration signal path arranged to feed a calibration signal to the feedback force transducer.

The infrasound detector may comprise a coupling arranged to provide a feedback force from the feedback force transducer to the infrasound transducer. For efficiency the coupling is preferably stiff relative to the force characteristics of the infrasound transducer and the feedback force transducer.

For robustness the infrasound detector may further comprise a suspension unit for arranging the infrasound transducer and the feedback force transducer relative to one another. The suspension unit preferably comprises a spring and/or a damper for arranging the infrasound transducer and the feedback force transducer relative to one another.

For accuracy the infrasound detector may further comprise an adjustment unit configured to adjust the suspension unit and/or the arrangement of the infrasound transducer and the feedback force transducer relative to one another. For accuracy the infrasound detector may further comprise an adjustment unit configured to adjust a means of providing the feedback force signal as input to the infrasound transducer. The adjustment unit may be arranged to adjust a force urging the infrasound transducer and the feedback force transducer relative toward or away from one another. The adjustment unit may be arranged to adjust the positions of the infrasound transducer and the feedback force transducer relative to one another. For convenience the adjustment unit may comprise a motor for the adjusting.

For accuracy the feedback force transducer may be at least partially in a pressure sealed housing.

The feedback force transducer may be a speaker, a diaphragm displacement transducer with a magnet and coil, a capacitance force transducer, or a piezo-electric force transducer.

The infrasound transducer may comprise a capacitive displacement transducer, a linear variable displacement transducer, or a displacement transducer with an optical sensor, a compliant diaphragm, a corrugated diaphragm, a bellow, and/or a stretched diaphragm of compliant material.

The infrasound detector may be for measurement of infrasound and near-infrasound and optionally low audible sound, preferably in a range of up to 200 Hz.

According to another aspect there is provided an array of infrasound detectors as aforementioned. An array of infrasound detectors can provide higher accuracy and precision of infrasound detection.

According to another aspect there is provided a method of calibrating an infrasound detector comprising an infrasound transducer configured to transduce an infrasound signal to an electrical signal, the method comprising the steps of: providing a calibration electrical signal to a force transducer configured to transduce the calibration electrical signal to a force signal and arranged to provide the force signal as input to the infrasound transducer; and determining the electrical signal from the infrasound transducer in dependence on the calibration electrical signal.

The infrasound detector may be as aforementioned. The force transducer may be a feedback force transducer as aforementioned.

According to another aspect there is provided a method of calibrating an infrasound detector comprising an infrasound transducer configured to transduce an infrasound signal to an electrical signal and a force transducer configured to transduce an electrical signal to a force signal and arranged to provide the force signal as input to the infrasound transducer, the method comprising the steps of: providing a calibration electrical signal to the force transducer; and determining a force signal from the infrasound transducer in dependence on the calibration electrical signal.

The infrasound detector may be as aforementioned. The force transducer may be a feedback force transducer as aforementioned.

As used herein, the term 'infrasound' preferably refers to a pressure fluctuation, also referred to as an acoustic fluctuation. The term 'infrasound' preferably refers to a frequency below 20 Hz.

Each of the aspects above may comprise any one or more features mentioned in respect of the other aspects above.

The invention extends to methods and/or apparatus substantially as herein described with reference to the accompanying drawings.

It can also be appreciated that these methods can be implemented, at least in part, using computer program code. According to another aspect of the present disclosure, there is therefore provided computer software or computer program code adapted to carry out these methods described above when processed by a computer processing means. The computer software or computer program code can be carried by computer readable medium, and in particular a non-transitory computer readable medium. The medium may be a physical storage medium such as a Read Only Memory (ROM) chip. Alternatively, it may be a disk such as a Digital Video Disk (DVD-ROM) or Compact Disk (CD-ROM). It could also be a signal such as an electronic signal over wires, an optical signal or a radio signal such as to a satellite or the like. The disclosure also extends to a processor running the software or code, e.g. a computer configured to carry out these methods described above.

Use of the words "controller", "device", "processor" and so on are intended to be general rather than specific. Whilst these features of the disclosure may be implemented using an individual component, such as a computer or a central processing unit (CPU), they can equally well be implemented using other suitable components or a combination of components. For example, they could be implemented using a hard-wired circuit or circuits, e.g. an integrated circuit, or using embedded software.

Any apparatus feature as described herein may also be provided as a method feature, and vice versa.

It should be noted that the term "comprising" as used in this document means "consisting at least in part of". So, when interpreting statements in this document that include the term "comprising", features other than that or those prefaced by the term may also be present. Related terms such as "comprise" and "comprises" are to be interpreted in the same manner. As used herein, "(s)" following a noun means the plural and/or singular forms of the noun.

As used herein, means plus function features may be expressed alternatively in terms of their corresponding structure, such as a suitably programmed processor and associated memory.

Preferred embodiments are now described, by way of example only, with reference to the accompanying drawings.

DESCRIPTION OF SPECIFIC EMBODIMENTS OF THE INVENTION

Figure 1:
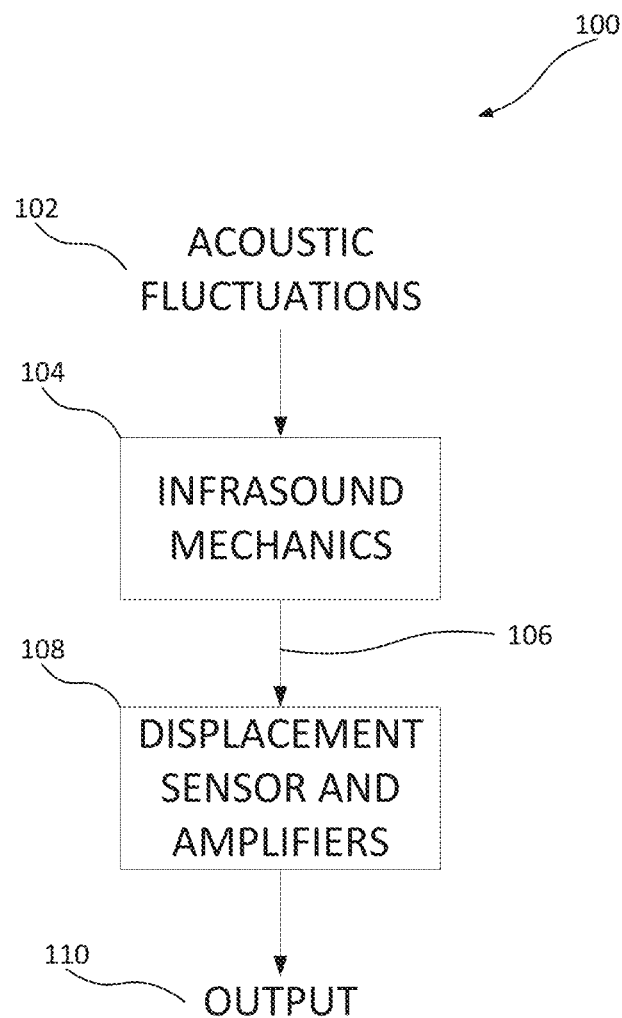
FIG. 1 is a schematic diagram of a prior art infrasound detector.

Referring to FIG. 1, a prior art infrasound detector 100 is shown. Acoustic fluctuations 102 are received into the prior art infrasound detector 100. Acoustic fluctuations 102 are received at the infrasound mechanics 104. The infrasound mechanics 104 (generally a compliant stretched diaphragm and a Direct Current (DC) biased capacitive displacement transducer) convert the acoustic fluctuations into an electrical signal 106. The electrical signal 106 is a voltage. The displacement sensors and amplifiers 108 take the voltage and apply some transformations such that a useful output 110 is outputted.

The prior art infrasound detector 100 is an open loop system. The system transfer function of the prior art open loop infrasound detector is given as:

$$\frac{\text{Volts}}{\text{Pressure}}(s) = \frac{G*K*A}{s^2 + 2\gamma w_n s + w_n^2} \quad \text{Equation 1}$$

The system transfer function of the prior art open loop infrasound detector is defined by the transfer function of the mechanical diaphragm, the capacitive transducer, (K is the capacitive transducer Volts/meter) and the amplifier stage (A is the amplifier gain). The mechanical stretched diaphragm is defined by the second order transfer function with resonant frequency of $w_n$ and damping coefficient $\gamma$. G is the overall detector coefficient.

The system transfer function is determined by the stiffness of the diaphragm which sets the resonant frequency and the damping factor of the infrasound mechanics 104. These parameters of the infrasound mechanics 104 are established during the design and manufacturing of the detector. The design and manufacturing of the infrasound mechanics 104 is not a simple or precisely repeatable process. The infrasound mechanics 104 and displacement sensors and amplifiers 108 set all of the response characteristics of the infrasound detector 100.

Figure 2A:
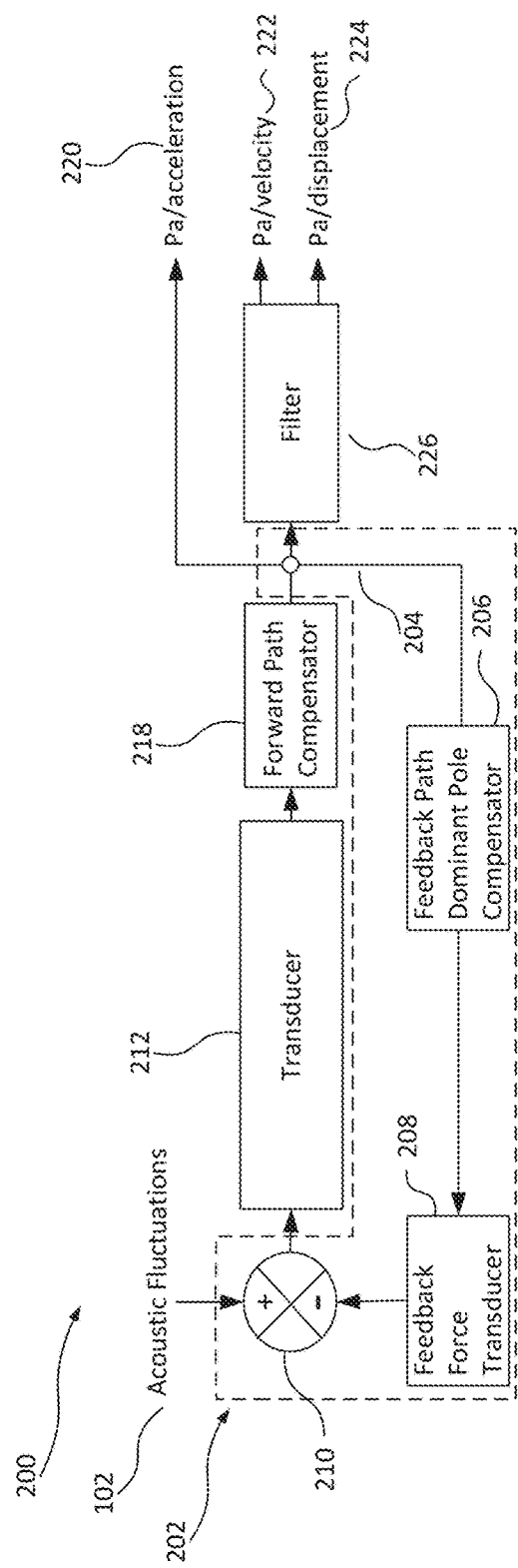
FIG. 2A is a schematic diagram of an infrasound device according to a preferred embodiment of the disclosure.

Referring now to FIG. 2A, according to a first embodiment, an infrasound device 200 is shown comprising a feedback module 202. The infrasound device 200 is configured to measure and output signals 220, 222, 224 indicative of input acoustic fluctuations 102. The infrasound device 200 in particular is configured to measure input acoustic fluctuations in the infrasound or near-infrasound range, in particular, from DC (0 Hz) to 200 Hz.

The feedback module 202 in this embodiment is built using passive electronic components. The passive electronic components include at least resistors, capacitors, inductors, and combinations thereof. In alternative embodiments, active circuits comprising op-amps and/or transistors may be used where extra gain and/or signal inversion is required. In a further alternative, digital signal processing techniques may be used. A person skilled in the art will appreciate that a number of different passive, active or digital topologies and systems are possible to use and may be selected for different requirements of the system design.

The feedback module 202 includes a feedback path 204, a feedback path dominant pole compensator 206, a feedback force transducer 208, and a signal mixer 210. The feedback module 202 can also be described as a feedback loop.

The infrasound device 200 comprises a transducer module 212. The transducer module 212 receives an infrasound signal and generates an electrical signal indicative of the infrasound signal. The infrasound signal is indicative of at least external pressure waves and acoustic fluctuations that are being measured. The transducer module 212 functions similarly to the infrasound mechanics 104 and displacement sensor and amplifiers module 108 of the prior art open loop infrasound detector 100. The transducer module 212 further comprises sensors and electronic circuits for converting physical responses of the transducer module to electrical signals.

The forward path compensator 218 processes the signal to modify the phase, gain, or other signal characteristics. In the present embodiment, the forward path compensator 218 is a phase sensitive detector. In an alternative embodiment, the forward path compensator is a Proportional Integral and Differential (PID) control block. The forward path compensator 218 can also be called a "controller" in the control systems sense or just a "compensator".

The feedback path 204 receives the output signal from the forward path compensator 218 and provides a return pathway back to the signal mixer 210 for system feedback by way of the feedback path dominant pole compensator 206 and the feedback force transducer 208. Alternatively the controller can be placed before the transducer or in the feedback path 204.

The signal mixer 210 is shown in FIG. 2A as a distinct component from the rest of the infrasound detector system 200 that takes in two inputs and has one output into the transducer. However it will be appreciated that the signal mixer 210 can also be combined with other components. In the present embodiment the transducer module 212, or a component thereof, is configured to function as the signal mixer 210 and as the transducer module 212. In this embodiment, the transducer module comprises a displacement transducer. The displacement transducer functions as both the mixer component mixing the two pressure signals and the transducing component used to measure the pressure signal. The displacement transducer is configured to receive two pressure signals, one from the acoustic fluctuations 102 and one from the feedback force transducer 208. The displacement transducer is used in the transducer module 212 to generate the electrical signals indicative of those two input signals. Described in another way, in this embodiment, the feedback force transducer 208 displaces the displacement transducer of the transducer module 212 in the form of negative feedback and the acoustic fluctuations 102 to be measured also displace the displacement transducer of the transducer 212. Therefore the displacement transducer has the function of an acoustic signal mixer as well as a transducer. In this embodiment, the mixing is achieved by coupling the feedback force transducer 208 output to the infrasound transducer module 212. In particular, the coupling of the feedback force transducer 208 to the transducer module 212 is stiff relative to the force characteristics of the transducer module 212 and the feedback force transducer 208.

The feedback path dominant pole compensator 206 is another controller or compensator block in a control systems sense. In the present embodiment, the feedback path dominant pole compensator 206 is an amplifier with gain of $\beta$. $\beta$ may be any value greater than or less than or equal to 1 depending on the design requirements of the final system. If $\beta$ is less than 1 then the feedback path dominant pole compensator 206 is considered an attenuator. In this embodiment, the feedback path dominant pole compensator 206 is a resistor network. In another embodiment, the feedback path dominant pole compensator 206 is not used and the feedback path 204 feeds directly into the feedback force transducer 208.

The feedback force transducer 208 converts the signal from the feedback path dominant pole compensator 206 to a physical signal, namely an acoustic fluctuation (a. pressure wave).

The pressure wave generated by the feedback force transducer 208 is inputted in the signal mixer 210. The signal mixer 210 takes the acoustic fluctuations 102 to be measured and subtracts the output from the feedback force transducer 208.

In this embodiment, the signals from the forward path compensator 218 that go through the feedback path 204 are electrical signals indicative of the acoustic fluctuations 102. In this embodiment, the feedback path dominant pole compensator 206 is an electrical circuit comprising passive electrical components. The feedback path 204 is a wire or track electrically coupling the output of the forward path compensator 218 to the feedback path dominant pole compensator 206. In particular, the feedback path 204 is a copper wire or copper track.

In this embodiment, the feedback module 202 is configured to provide negative feedback at the input of the transducer module 212. The feedback module is configured to modify the feedback signal such that the electrical signal inputted to the feedback force transducer 208 causes the feedback force transducer 208 to generate a signal that matches the amplitude of the infrasound signal as inputted into the transducer 212 and is phase shifted by 180°.

Figure 2B:
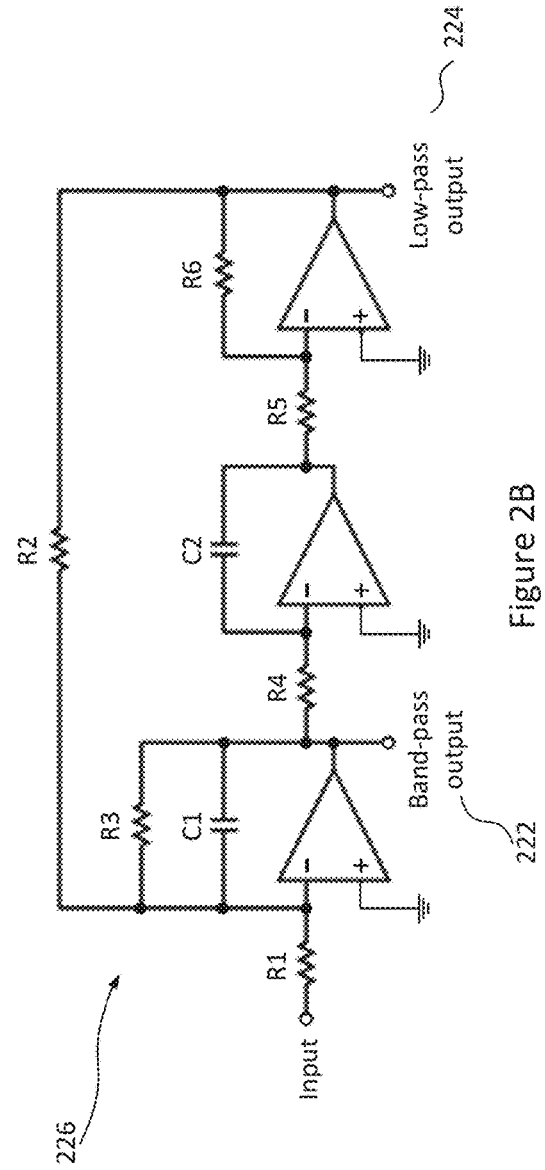
FIG. 2B is a circuit diagram of an example filter system.

The infrasound detector 200 further comprises a filter block 226. The filter block can also be considered an integrator block. The filer block can also comprise an integrator block. In the present embodiment, a bandpass filter and low pass filter is used and implemented using a two-integrator-loop topology. In particular, the filter system of FIG. 2B is used. Alternatively, other filtering circuits and or digital signal processing techniques may be used.

The infrasound detector 200 outputs three electrical signals 220, 222, 224. The first output signal 220 is an electric signal indicative of the second derivative of the input acoustic fluctuations, also known as the pressure acceleration. The second output signal 222 is an electric signal indicative of the first derivative of the input acoustic fluctuations, also known as pressure velocity. The third output signal 224 is an electric signal indicative of the acoustic fluctuations, also known as pressure displacement.

Referring to FIG. 2B, a circuit diagram for a second order Tow-Thomas Biquad (biquadratic) filter is shown. This filter provides two outputs, one band-pass output and one low-pass output. The Tow-Thomas Biquad filter is a two-integrator-loop topology. In this embodiment, the band-pass output is the pressure velocity signal 222 output and the low-pass output is the pressure displacement signal 224 output.

Figure 3:
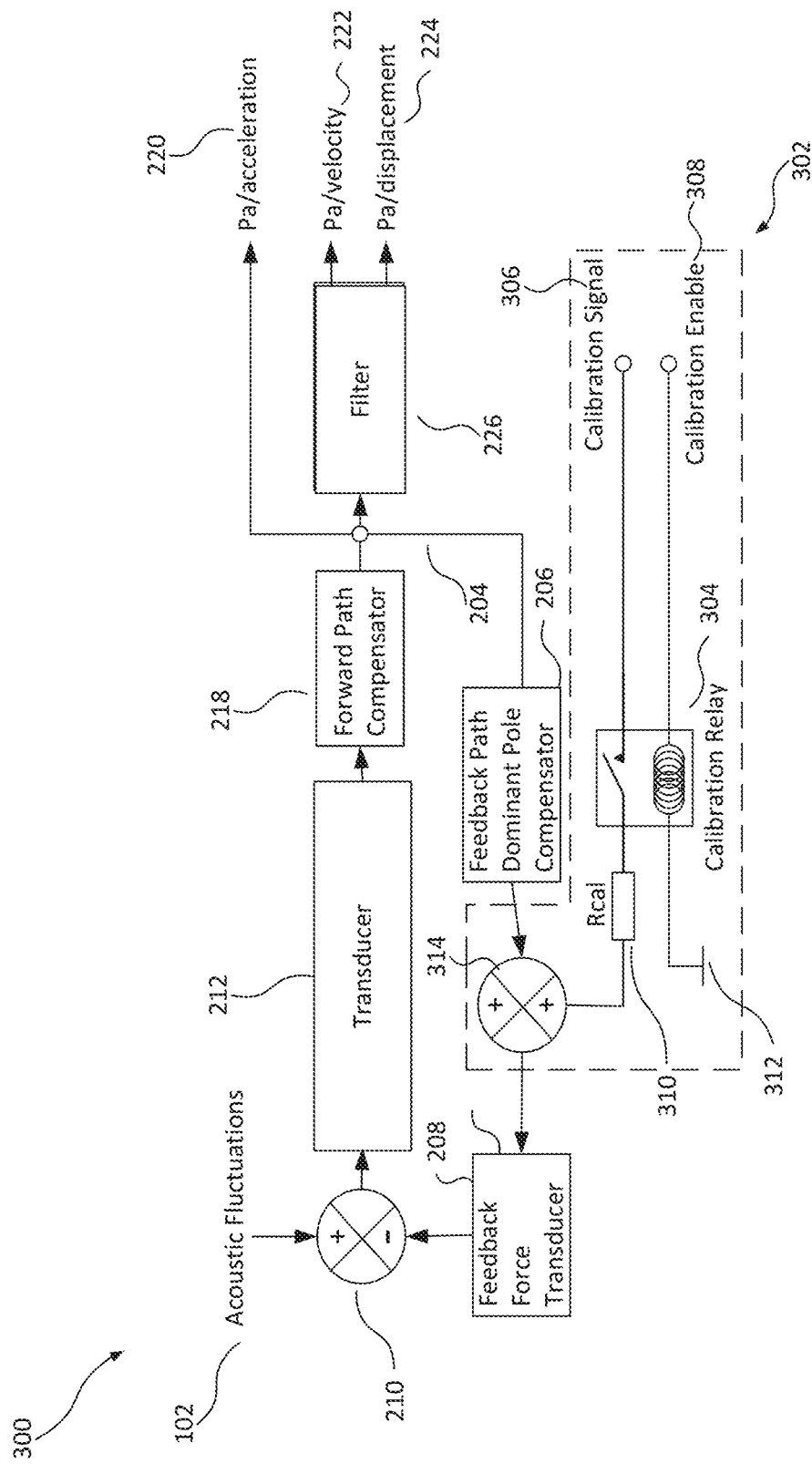
FIG. 3 is a schematic diagram of an infrasound device according to a preferred embodiment of the disclosure further comprising a calibration system.

Referring to FIG. 3, another embodiment of the infrasound detector 300 is described comprising a calibration system 302. The infrasound detector 300 of this embodiment is substantially the same as the infrasound detector 200 as described with reference to FIG. 2A. When the calibration system 302 is not enabled, the infrasound detector 300 behaves substantially the same way as the infrasound detector 200 of the embodiment described with respect to FIG. 2A. The calibration system 302 allows for in-situ calibration. The calibration module 302 comprises a calibration relay 304, a calibration signal 306, a calibration enable signal 308, a calibration resistor Rcal 310, an electrical earth connection 312 and a calibration signal mixer 314.

The calibration signal 306 is injected into the feedback loop via the mixer 314, the calibration resistor 310 and the calibration relay 304. The calibration relay 304 is enabled via the calibration enable signal 308. The calibration signal 306, after being injected into the feedback force transducer 208 affects the diaphragm of the transducer 212 similarly to the acoustic fluctuations and feedback signal as previously described with reference to FIG. 2A.

The feedback force transducer 208 has an associated feedback coil constant with the units of Amperes/m/s². The calibration process is done to characterise the feedback coil constant and therefore calibrate the feedback force transducer 208. To calibrate the feedback force transducer 208, a weight is added to the diaphragm of the feedback force transducer 208 which causes the diaphragm to deflect. The weight is accurately measured before or after placing on the feedback force transducer diaphragm or is a previously known weight. Current is injected into the feedback force transducer 208 until the diaphragm moves back to its original position. The current is accurately measured. This process is used with different weights (and therefore forces required displace the diaphragm of the transducer 212). The plot of current against force gives the calibration signal appropriate for the feedback coil constant of the feedback force transducer. To improve accuracy, local gravity must also be known, measured, or estimated. Techniques for measuring and/or estimating gravity are known in the art.

Figure 4:
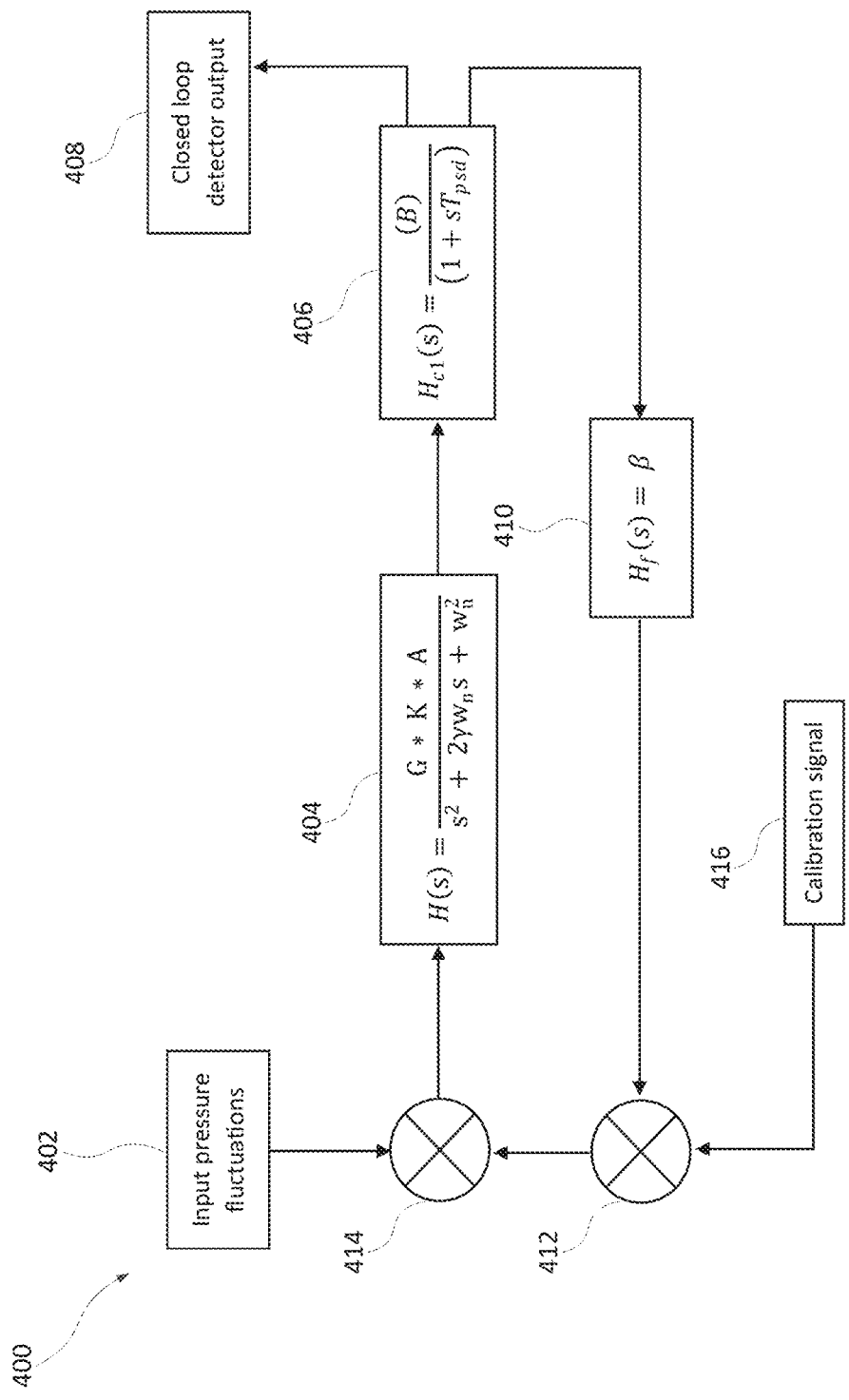
FIG. 4 is a systems block diagram of an infrasound device according to a preferred embodiment of the disclosure.

Referring to FIG. 4, a systems block diagram of an infrasound device 400 according to a preferred embodiment of the disclosure is shown. The diagram describing the infrasound device 400 shows input pressure fluctuations 402 (in this embodiment, these are the same as the acoustic fluctuations 102), a plant transfer function 404, a forward path compensator transfer function 406, a closed loop detector output 408, a feedback system transfer function 410, signal mixers 412, 414, and a calibration signal 416.

The control blocks described with reference to FIG. 4 and FIG. 5B and any equations discussed do not include any phase inversion for ease of explanation. A person skilled in the art will appreciate that the phase can be inverted at any point using a phase inverting circuit (or a digital equivalent). For example, the integrator transfer function 564, when implemented using an op-amp integrator will usually provide an inverted signal. The integrator transfer function 564 presented in FIG. 5B lacks the minus symbol to show that the signal is inverted as the op-amp integrator is merely an implementation example. A person skilled in the art will understand that the integrator output signal can be inverted if required. A phase inversion can also be described as a phase shift by 180°.

The input pressure fluctuations 402 are inputted into the signal mixer 414. The output of the signal mixer 414 goes through the plant transfer function 404. The plant transfer function 404 models the mechanical properties of the infrasound detector 200. The output of the plant transfer function 404 is inputted to the forward path compensator transfer function 406. The output of the forward path compensator transfer function 406 is split into the closed loop detector output 408 and to the feedback system transfer function 410. The feedback system transfer function 410 output is mixed with the calibration signal 416 at the mixer 412. The output of the mixer 412 is input into the mixer 414 thereby completing the feedback loop.

The forward path compensator transfer function 406 is provided in Equation 2 below:

$$H_{c1}(s) = \frac{(B)}{(1 + sT_{psd})} \quad \text{Equation 2}$$

The feedback system transfer function 410 is provided in Equation 3 below:

$$H_f(s) = \beta \quad \text{Equation 3}$$

Not including any of the feedback stability compensation components and parameters, the simplified infrasound detector transfer function is:

$$\frac{\text{Volts}}{\overset{\cdot}{\text{P}}_a}(s) = \frac{G*K*A}{s^2 + 2\gamma w_n s + (GKA\beta + w_n^2)} \quad \text{Equation 4}$$

From Equation 4 above, the effective stiffness of the infrasound detectors diaphragm is increased by an amount equal to the DC feedback loop gain of the infrasound detector provided in Equation 5 below:

$$G*K*A*(\beta/w_n^2) \quad \text{Equation 5}$$

The natural resonant frequency of the diaphragm is increased by the square root of the factor given in Equation 5 above indicating that the diaphragm response is modified without any mechanical change or alteration. The response of the infrasound detector 200 is established with stable electronic components allowing for accurate and consistent responses. The electronic components determine the gain of the sensor loop and consequently the overall system gain and frequency response of the infrasound detector 200. The frequency response of the detector not only can be DC coupled but also the high frequency portion of the detector can be stretched further predictively and consistently. The matching of detector parameters from detector to detector is determined by the electronic components. This is in contrast to prior art infrasound detectors 100 where matching of detector parameters requires mechanical matching, a much more involved process.

By incorporating feedback force proportional to the velocity of the diaphragm movement, the effective damping can be increased electronically. The damping coefficient of the mechanics is controlled without the need of introducing mechanical means to adjust the detector response.

As previously discussed with reference to FIG. 3, the feedback system allows injection of calibration signal 416 in to the feedback path of the infrasound detector 300 facilitating system calibration.

The infrasound detector 200 system frequency response and gain can be measured at any time accurately giving reassurance of the detector performance and characteristics.

Figure 5A:
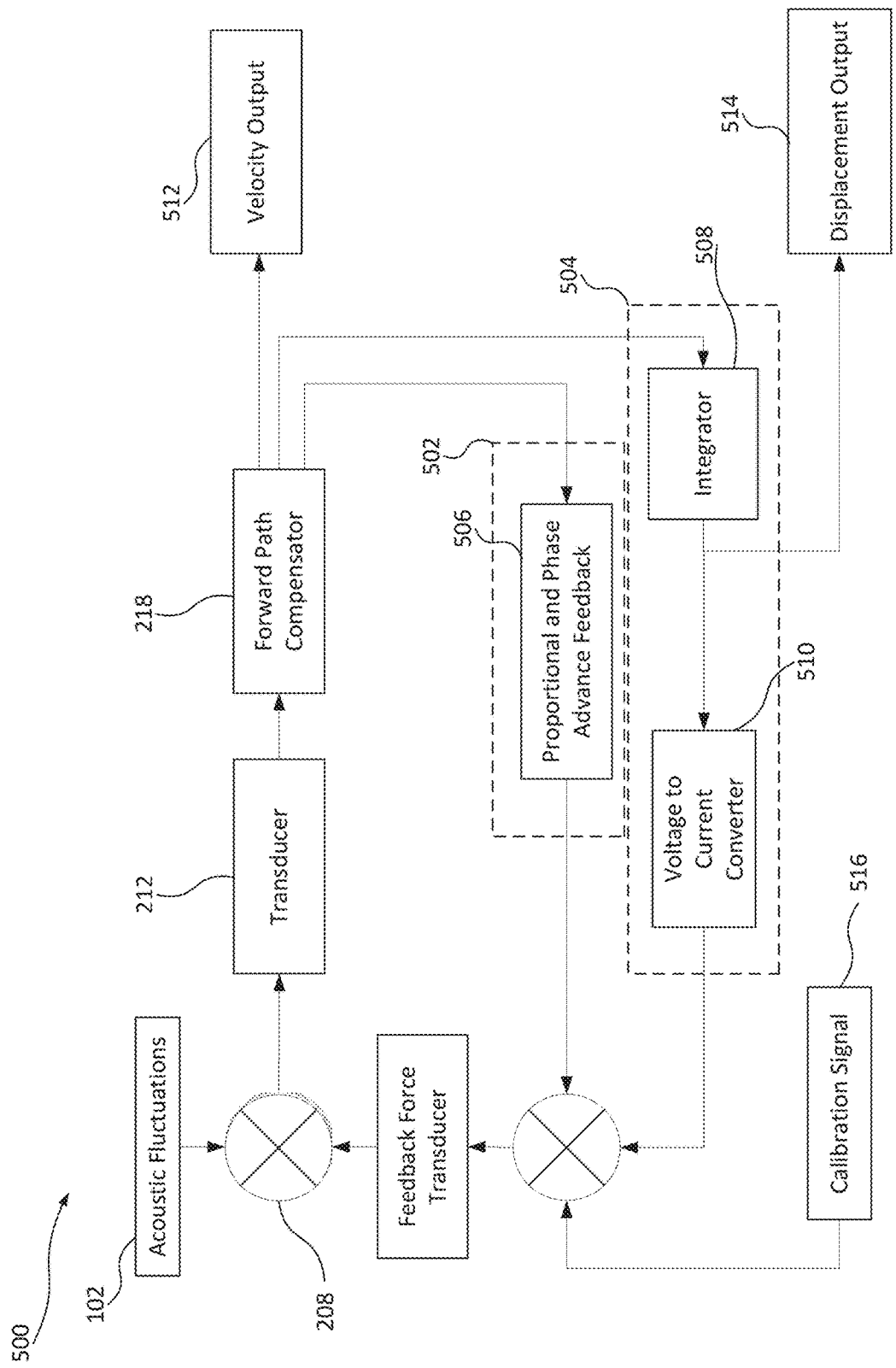
FIG. 5A is a schematic diagram of an infrasound device according to a preferred embodiment of the disclosure comprising two feedback paths.

Referring to FIG. 5A, an infrasound device 500 is shown comprising two feedback paths 502, 504. The infrasound device 500 functions similarly to the infrasound device 300 described with reference to FIG. 3. This embodiment provides an alternative feedback topology. The outputs of this alternative embodiment are the derivative (or rate of change, or velocity) of pressure and pressure (or displacement pressure). Both outputs are available at the same time From the forward path compensator 218, the signal is split out into three places. The signal from the forward path compensator 218 is an input to the first feedback loop 502. The first feedback loop comprises a proportional and phase advance feedback module 506. In the present embodiment, the proportional and phase advance feedback module 506 is implemented with electronic components.

The signal from the forward path compensator 218 is also an input to the second feedback loop 502. The second feedback loop comprises an integrator 508 and a voltage to current converter 510. The integrator 508 in this embodiment is implemented as an op-amp integrator and the voltage to current converter 510 is implemented as a resistor. A person skilled in the art will appreciate that other circuits may be capable of implementing these modules. The displacement output 514 is the output from the integrator 508.

The calibration signal 516 and output from the first and second feedback paths are mixed and inputted into the feedback force transducer 208.

The calibration system has been simplified in this example to only comprise the calibration signal 516. In some embodiments, the full calibration system 302 is used. Alternatively, no calibration system or signal is used.

Figure 5B:
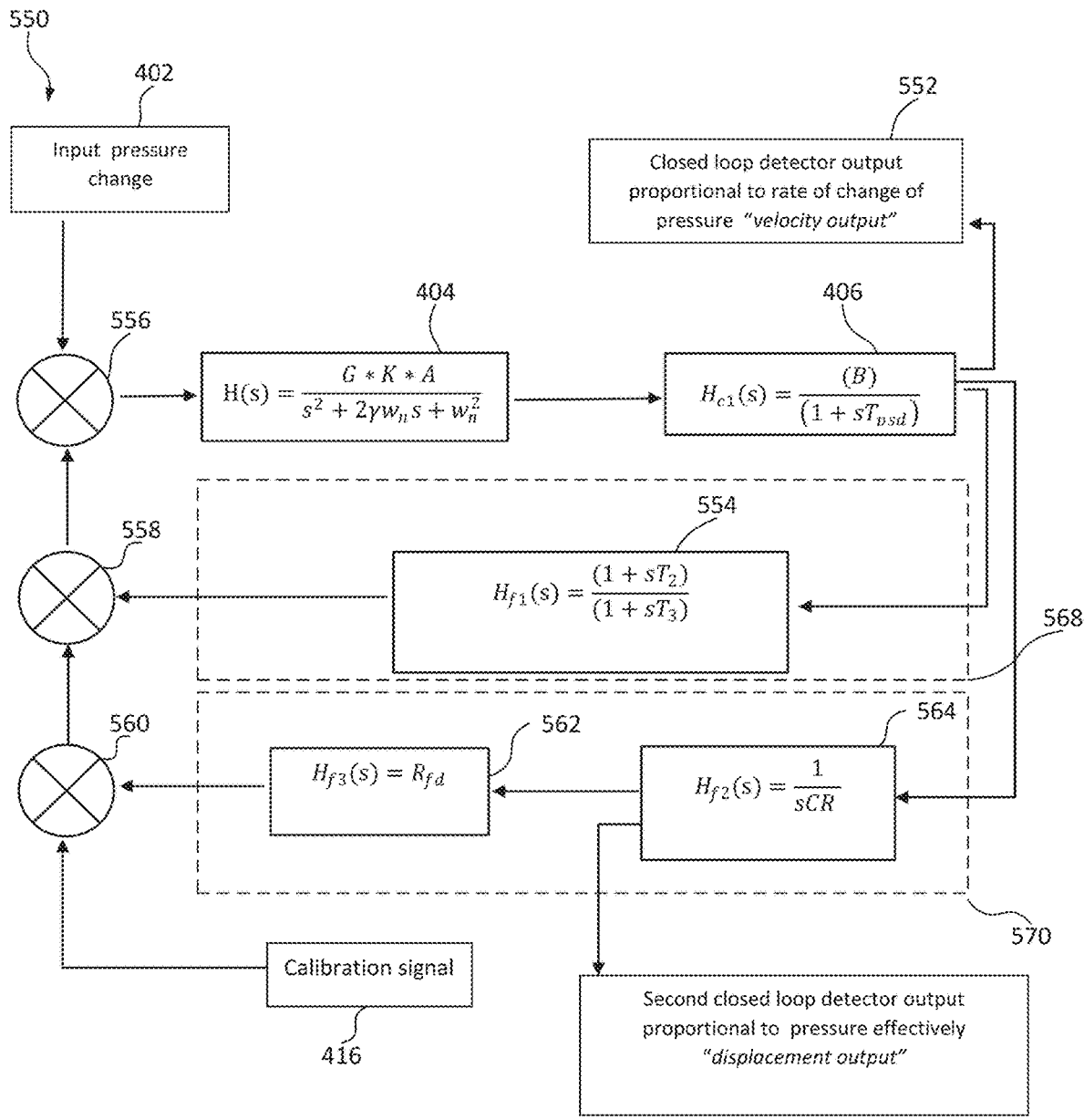
FIG. 5B is a systems block diagram of an infrasound device according to a preferred embodiment of the disclosure comprising two feedback paths.

Referring to FIG. 5B, a systems block diagram of an infrasound detector 550 according to an embodiment of the disclosure is shown. The systems block diagram presented here of the infrasound detector 550 substantially matches the system layout of the infrasound device 500 as described with reference to FIG. 5A.

As previously described with reference to FIG. 5A, the infrasound device of this embodiment comprises two separate parallel feedback paths. A first feedback loop or path 568 comprises a transfer function $H_{f1}(s)$ 554 which receives input from the output of the forward path compensator transfer function 406. The transfer function $H_{f1}(s)$ 554 is provided in Equation 6 below:

$$H_{f1}(s) = \frac{(1 + sT_2)}{(1 + sT_3)} \quad \text{Equation 6}$$

The output of the transfer function $H_{f1}(s)$ is connected to a mixer 558.

The mixer 558 also receives the input pressure change 402 as an input. The mixer 558 outputs to the plant transfer function 404.

The second feedback loop or path 570 comprises two transfer functions $H_{f2}(s)$ 564 and $H_{f3}(S)$ 562. The transfer function $H_{f2}(S)$ 562 is provided in Equation 7 below:

$$H_{f2}(s) = \frac{1}{sRC} \quad \text{Equation 7}$$

The transfer function of $H_{f2}(S)$ describes an integrator. The transfer function $H_{f3}(s)$ 564 is provided in below:

$$H_{f3}(s) = R_{fd} \quad \text{Equation 8}$$

The input to the transfer function $H_{f2}(S)$ 564 is the output of the forward path compensator transfer function $H_{c1}(s)$ 406. The output of the $H_{f2}(S)$ 564 transfer function is the input to the $H_{f3}(s)$ transfer function 562. The output of the $H_{f3}(s)$ transfer function 562 is inputted into a mixer 560. The mixer 560 also receives the calibration signal 416 as an input. The output of the mixer 560 is an input to the mixer 558. Alternatively, one mixer with three inputs may be used that receives output from the transfer function $H_{f1}(s)$ 554, the transfer function $H_{f3}(s)$ 562, and the calibration signal 416.

There are two separate feedback paths 568, 570. The velocity (or pressure derivative or rate of change of pressure) output of the detector has the same transfer function as a second order bandpass filter. The displacement output has the transfer function of a second order low pass filter. The displacement output of the detector is proportional from the low corner frequency of the response up to the high frequency corner both set by the feedback parameters.

The transfer function $H_{f1}(s)$ 554 is the phase advance and displacement feedback parameters.

$H_{f2}(S)$ 564 and $H_{f3}(S)$ 562 are jointly the feedback integrator that sets the lower corner frequency of the detector.

Figure 6:
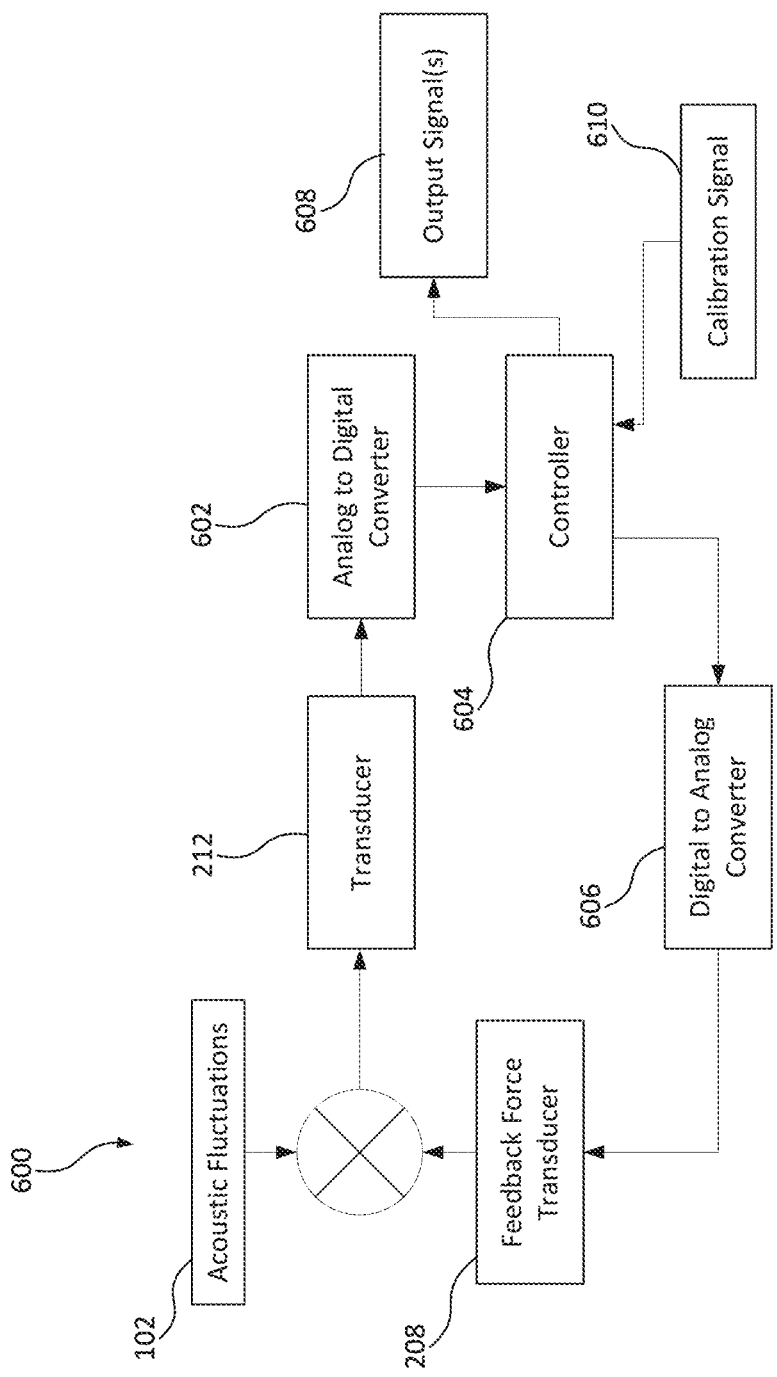
FIG. 6 is a schematic diagram of an infrasound device according to a preferred digital implementation embodiment of the disclosure.

Referring to FIG. 6, an alternative embodiment of the present invention is described wherein the electrical components of the example infrasound detectors 200, 300, 400, 500, 550 of FIGS. 2 to 5B are implemented on a controller 604 such a microcontroller. The digital infrasound detector 600 functions similarly to the other infrasound detectors 200, 300, 400, 500, 550 and all of the same functional blocks and modules of those infrasound detectors 200, 300, 400, 500, 550 are implemented using digital signal processing techniques instead of electronic circuits. The digital signal processing functions that map to the electrical circuits of the infrasound detectors 200, 300, 400, 500, 550 are stored as instructions on the storage or the memory of the controller 604 such that the CPU can access and execute them.

As with the other infrasound detectors 200, 300, 400, 500, 550, pressure waves and/or acoustic fluctuations 102 are introduced to the system and a transducer 212 converts the pressure waves into electrical signals. This alternative embodiment converts the electrical signals to digital ones using an analogue to digital converter 602. The digital signal is passed to a CPU on the controller 604 for digital signal processing.

In this alternative embodiment, except for before the analogue to digital converter 602 and after the digital to analogue converter 606, the signals or electrical signals are instead digital signals and digital signal processing techniques are used instead of the electrical circuits. In this alternative embodiment, the infrasound detector 600 comprises a Central Processing Unit (CPU), memory, and storage. The CPU executes instructions, including instructions stored in the memory and storage. The instructions executed by the CPU include instructions for processing signal to and from the other components of the infrasound detector 600. The memory is implemented as one or more of a computer-readable media, a volatile memory unit or units, or a non-volatile memory unit or units, making up Random Access Memory (RAM). Storage is provided integrally with the infrasound detector 600. The storage is arranged to store computer executable code defining the digital signal processing techniques described with reference to the electrical circuits of the infrasound detectors 200, 300, 400, 500, 550. The memory is also arranged to store elements of this computer executable code. Typically, the elements of the computer executable code stored by the memory comprise instructions essential to basic operation of the infrasound device 600 and elements that are stored transiently whilst some particular process is handled by the CPU.

The controller 604 is configured to output digital output signal(s) 608. The digital output signal(s) 608 represent any one or more of the following:

Pressure acceleration,
Pressure velocity, and/or
Pressure displacement.

The controller 604 is also configured to receive a calibration signal 610. In this alternative embodiment, the calibration signal 610 is digital signal a user inputs once to configure the infrasound detector 600.

The feedback signals are sent from the controller 604 to a digital to analogue converter 606. The feedback signals also comprise calibration related signalling. The electrical analogue signals are sent to the feedback force transducer 208 as with the other infrasound detectors 200, 300, 400, 500, 550.

In one embodiment, the digital to analogue 606 and analogue to digital 602 converters are on the same integrated circuit as the controller 604. Alternatively, they are on separate integrated circuits.

Hardware Design

Figure 7A:
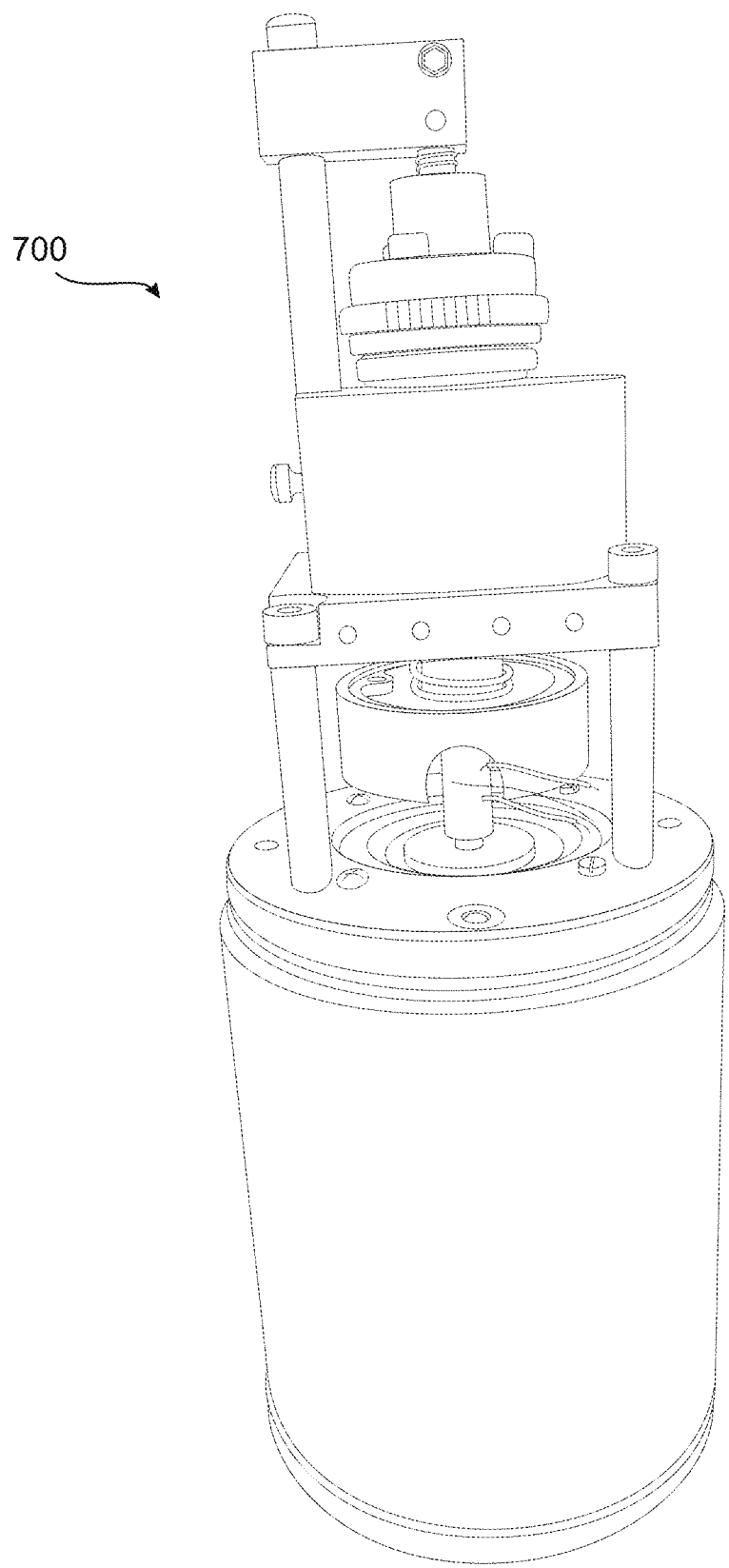
FIGS. 7A and 7B are photographs of prototype infrasound detectors according to a preferred embodiment of the disclosure.
Figure 7B:
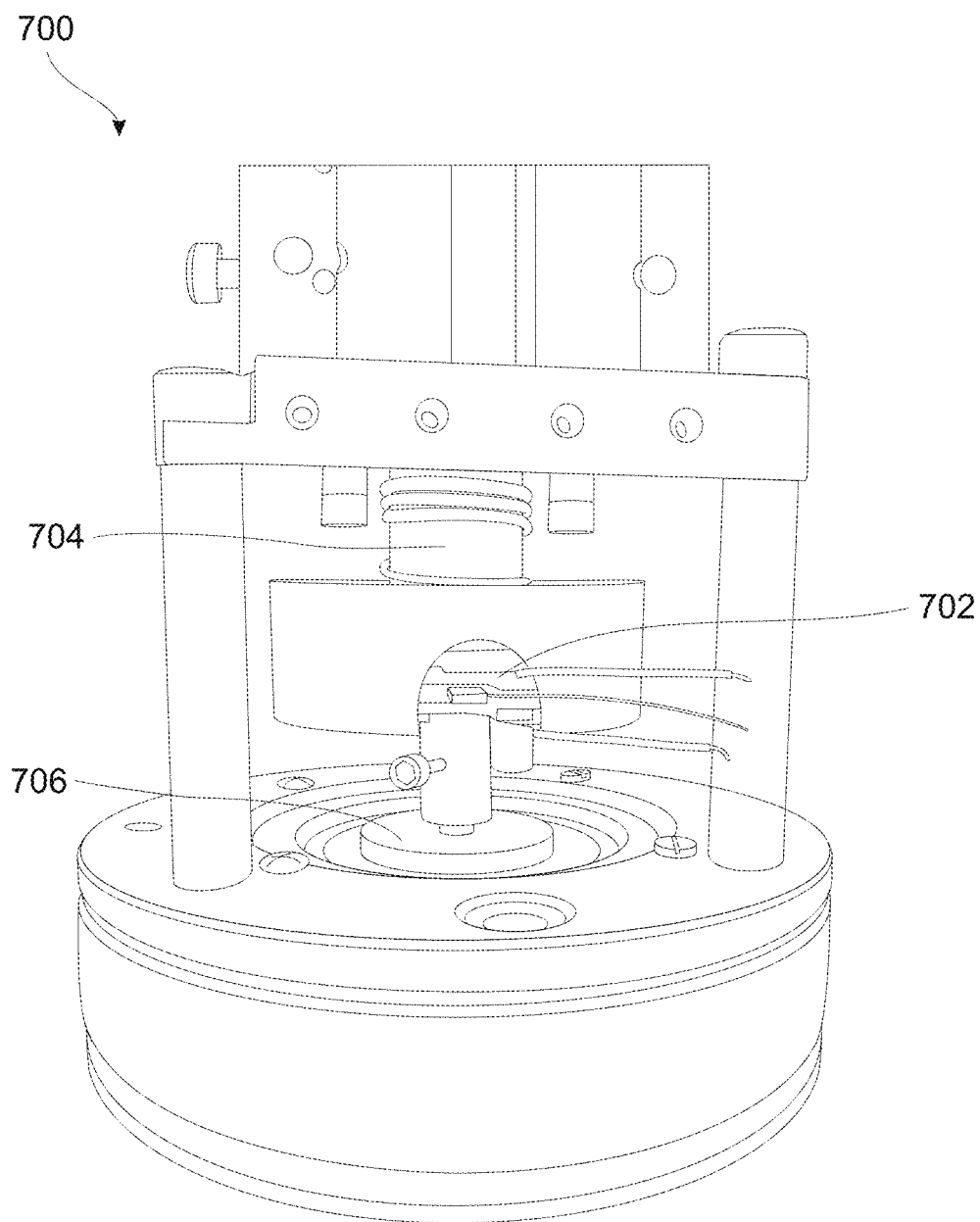

Referring to FIGS. 7A and 7B, photographs of an example prototype infrasound detector 700 based on a large speaker are shown. FIG. 7A shows a capacitive differential displacement transducer 702, an adjustment mechanism 704, and a speaker 706 comprising a diaphragm. FIG. 7B shows these components in greater detail.

Figure 8:
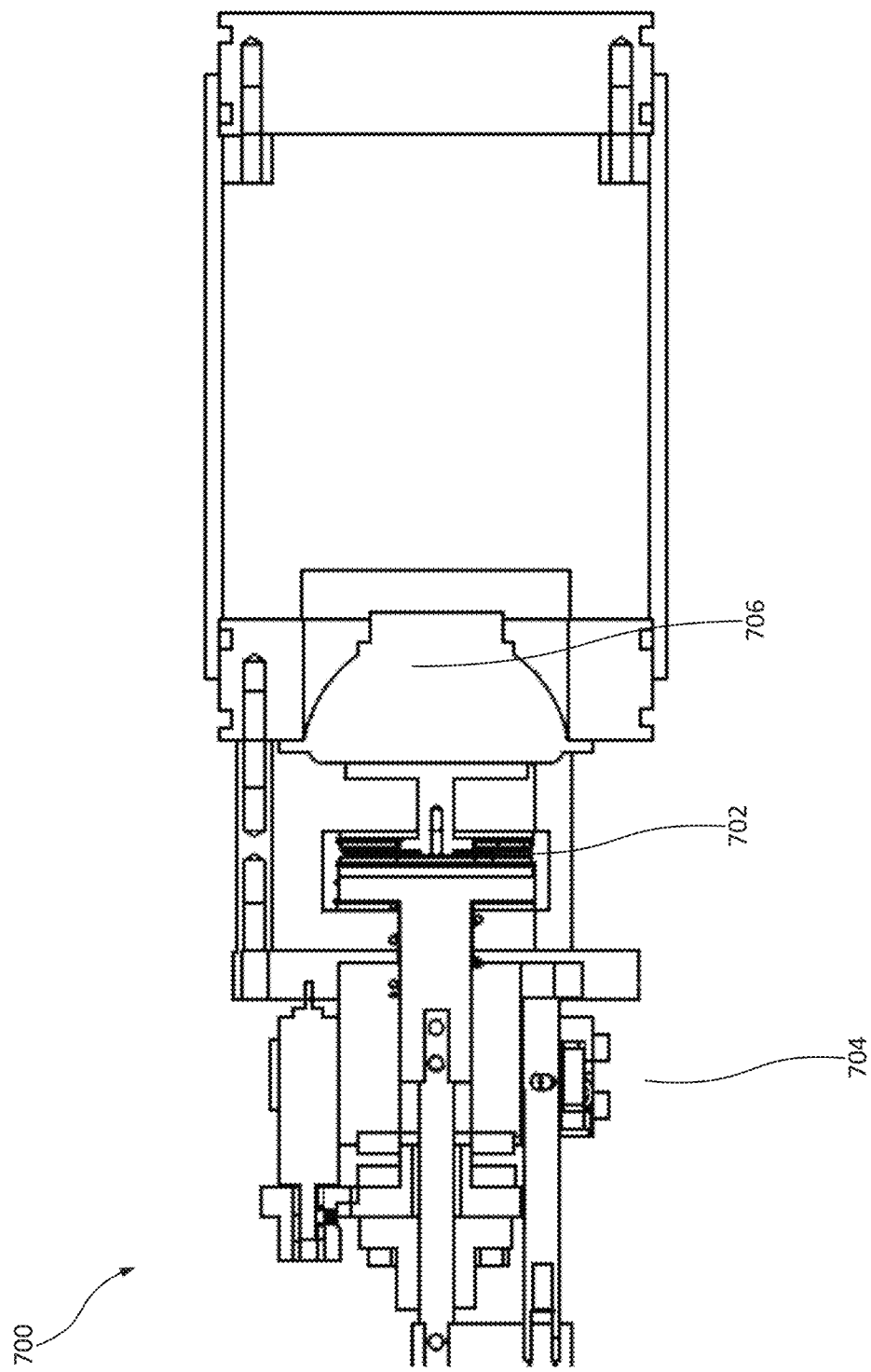
FIG. 8 is a 3D Computer-aided design drawing of a prototype infrasound detector according to a preferred embodiment of the disclosure.

Referring to FIG. 8, an example 3D Computer-aided design (CAD) model of a prototype infrasound detector 700 is shown. The diameter of the infrasound detector 700 is 75 mm. Shown in FIG. 8 are the adjustment mechanism 704 comprising a controlling mechanism and limit switches, the differential capacitive displacement transducer 702, and the speaker 706. The speaker 706 functions as the feedback force transducer and comprises a rectilinear motion mechanism.

The differential capacitive displacement transducer 702 is the preferred detector for this application. The differential capacitive displacement transducer 702 can have very high responsivity and physically the overall dimensions can be very small.

The signal from the differential capacitive displacement transducer 702 is synchronously detected and the detected signal is fed back to the "speaker" magnetic feedback force transducer through feedback compensating transfer functions as in any one or more of the systems described with reference to FIGS. 2 to 6, phase advance and/or Proportional Integral and Differential (PID) controllers.

The differential capacitive displacement transducer 702 movement is detected with a low noise>3 nV/$\sqrt{Hz}$ charge amplifier at a frequency of 45 KHz.

In the present embodiment, the differential capacitive displacement transducer 702 circuitry is a Blumlein bridge arrangement operating at a frequency of 45 K Hz and driver signal with amplitudes of 20 Vrms.

The sensitivity of the differential capacitive displacement transducer 702 exceeds 60,000 V/m with a noise level of $5 \times 10^{-14}$ m/$\sqrt{Hz}$ resulting in a transducer system with unprecedented sensitivity and detector noise level.

The system noise performance affects the infrasound detector's ability to detect smaller signals. The system noise performance is further enhanced with of the use of a synchronous detection system in the forward path of the feedback system. The infrasound detector control system is designed for the best stability phase and gain margins with loop gains in excess of 100 dB. The use of synchronous detection ensures that the amplifier transducer system noise performance is not dominated by the flicker noise of low frequency and DC amplifiers.

A speaker 706 functions as the feedback force transducer 208 as described with reference to FIGS. 2 to 6 and applies the feedback force to the system. The speaker 706 used has a sealed diaphragm manufactured from non-porous material facilitating a sealed operation of the infrasound detector 700.

A differential capacitive displacement transducer 702 functions as the transducer module 212 as described with reference to FIGS. 2 to 6 and generates electric signals indicative of input infrasound signals.

The differential capacitive displacement transducer 702 is operatively coupled to the cone of the speaker 706. This simple compact assembly conveniently forms the main required parts of the infrasound detector 700. The overall size of the infrasound feedback detector is largely determined by the size of the speaker 706. The speaker 706 can be very small; for example in the design illustrated in FIGS. 6-8 the diameter of the baffle of the speaker is 50 mm. The overall diameter of the infrasound detector 700 is 75 mm with the 50 mm speaker cone 706.

The infrasound detector 700 further comprises a suspension unit for arranging the differential capacitive displacement transducer 702 and the speaker 706 relative to one another. The suspension unit comprises a damping mechanism to arrange the differential capacitive displacement transducer 702 and the speaker 706. The damping mechanism is a spring in this embodiment.

The infrasound detector 700 further comprises the adjustment mechanism 704 to adjust position the differential capacitive displacement transducer 702 relative to the speaker 706. In this embodiment, the adjustment mechanism 704 adjusts the suspension unit. The adjustment mechanism can changed to bring the differential capacitive displacement transducer 702 and speaker 706 closer together or further apart from each other. The relative position of the differential capacitive displacement transducer 702 and speaker 706 will affect the performance of how the speaker 706 affects the differential capacitive displacement transducer 702.

The adjustment mechanism 704 is required as the displacement feedback needs to be nulled (zeroed or centred) during the normal operation of the infrasound detector 700.

In this embodiment, the adjustment mechanism 704 is motorised. In particular, the adjustment mechanism 704 is a motorised spring loaded nulling mechanism 704.

The mechanical assembly of the infrasound detector 700 as shown in FIGS. 7A and B does not show the electronics components. The electronic components are housed in the upper section of the detector housing with digitisers and digital control.

Figure 9:
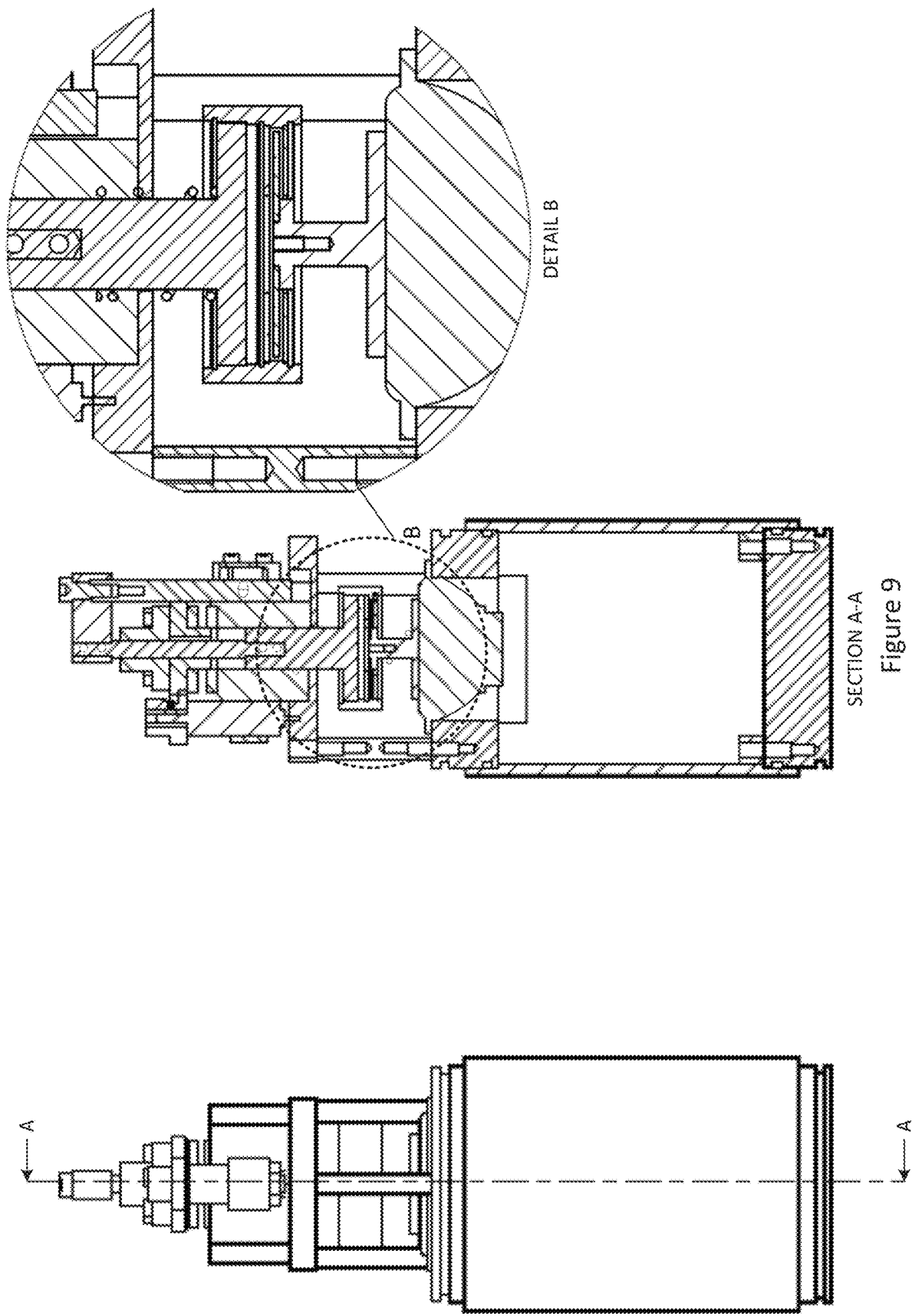
FIG. 9 is an assembly drawing of an infrasound detector according to a preferred embodiment of the disclosure.

Referring to FIG. 9, an assembly drawing an infrasound detector 700 of various parts on the feedback transducer without the electronics is shown.

Figure 10:
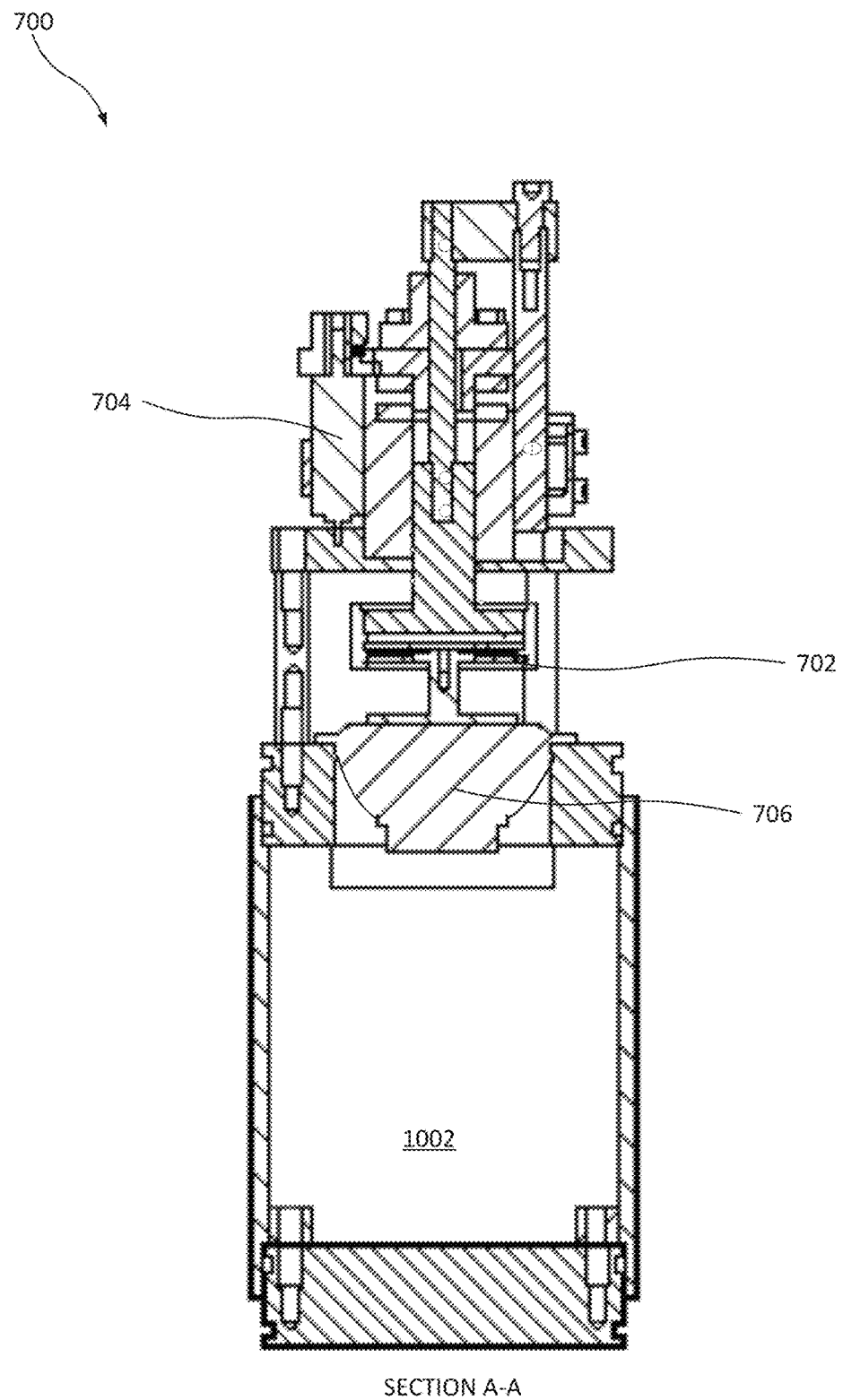
FIG. 10 is an assembly drawing of an infrasound detector according to a preferred embodiment of the disclosure.

Referring to FIG. 10, an assembly drawing of an infrasound detector 700 is shown. The assembly drawing is a close up of the assembly drawing of FIG. 9.

The infrasound detector 700 comprises an internal sealed pressure housing 1002, the speaker 706, and the differential capacitive displacement transducer 702. The speaker 706 is coupled to the internal sealed pressure housing 1002. The infrasound detector 700 of FIGS. 7A, 7B, 8 and 9 are substantially the same and can be configured to perform in the same way as any one or more of the infrasound detectors 200, 300, 400, 500, 600 described with reference to FIGS. 2 to 6. The speaker 706 is functioning as the feedback force transducer in this embodiment.

The nature of the mechanical structure of the infrasound detector assembly ensures cost effective design. The manufacturing cost of the infrasound detector 700 of the present embodiment is substantially less that any of prior art infrasound detectors 100 currently available. The cost reduction is likely to be a factor of at least 5.

There are many types of speaker designs that can be used. In the present embodiment, the main requirement is that the movement of the speaker diaphragm is in a single degree of movement without spurious modes of suspension resonances. Open loop microphones can exhibit complex diaphragm vibrations. The use of a very stiff speaker baffle eliminates such complex diaphragm modes of resonances. In particular, a miniature speaker with aluminium diaphragm and a rectilinear mechanical suspension mechanism are used.

In the hardware described with reference to the infrasound detector 700 alternative components may be used. Instead of a compliant diaphragm as part of the differential capacitive displacement transducer 702 or of the feedback force transducer, any one or more of the following may be used alone or in conjunction with each other:

a corrugated diaphragm,
a bellow, and/or
a stretched diaphragm of compliant material.

Instead of the speaker 706 as the feedback force transducer, any one or more of the following and may be used alone or in conjunction with each other:

magnet and coil,
capacitance force transducer, and/or
piezo-electric force transducer.

Instead of the differential capacitive displacement transducer 706, any one or more of the following may be used alone or in conjunction with each other:

Linear variable displacement transducer (LVDT),
Capacitive transducer, and/or
Optical sensor.

Alternatively, infrasound detector 700 uses a velocity transducer (magnet and coil) where the same magnet is used with another coil as the feedback force transducer. This alternative embodiment is also known as velocity feedback system. This embodiment will form a feedback circuit that improves response characteristics of the sensor, but will not be as sensitive as infrasound detector that uses a displacement transducer, particularly a differential capacitive transducer.

In another embodiment, multiple infrasound detectors are be used together in an array. The output signals of the array of infrasound detectors is received at a single computing device which is configured to store and digitally process the infrasound data generated by the infrasound detectors.

Seismic Isolation

Improvements in seismic isolation can be made by taking advantage of the highly deterministic characteristics of the infrasound detector 200. In this case, the infrasound detector 200 will respond only to pressure fluctuations and not pressure and local seismicity at the same time. Seismic signals interfere with the pressure signal that is being measured. A preferred method to remove seismic and environmental noise or signals is to provide a second, matched, infrasound detector 200 module inside the sealed pressure chamber of the first/primary infrasound detector 200. It is possible to accurately match the primary and secondary infrasound detectors 200 because of their highly deterministic characteristics. The output of the second infrasound detector 200 is subtracted from any one or more of the signals of the primary infrasound detector 200. In the present embodiment, the output of the second infrasound detector 200 is subtracted from the output of the primary infrasound detector 200. The signals are both electric and subtraction is done a signal subtraction circuit. In an alternative embodiment, the signals are digital and are subtracted digitally. In a further alternative embodiment, the output of the second infrasound detector 200 is subtracted from the input of the primary infrasound detector 200 where the output of the second infrasound detector 200 is converted from an electrical or digital signal to a pressure signal. In these embodiments, some signal conditioning, filtering and/or amplification may be required depending on the specific design requirements of the final system. By subtracting the output of the secondary infrasound detector 200 any one or more of the signals of the primary infrasound detector 200, a reduction or complete removal of seismic and environmental variations in the primary infrasound detector 200 and thus only pressure waves are detected. This process is known mathematically as signal correlation. A person skilled in the art will appreciate that other signal correlation methods may be used as an alternative. An apparatus of this type would not work with prior art infrasound detectors 100 because the infrasound detector 100 characteristics cannot be matched in amplitude and phase response to a high enough accuracy.

Results

The plots presented in FIGS. 11 to 14 show performance characteristics of a prior art infrasound detector 100 and that of an infrasound detector system in accordance with an embodiment of this application where the hardware is as described with reference to FIGS. 6 to 9 and where the electrical feedback system is as described with reference to the electrical feedback system of FIG. 4.

Figure 11:
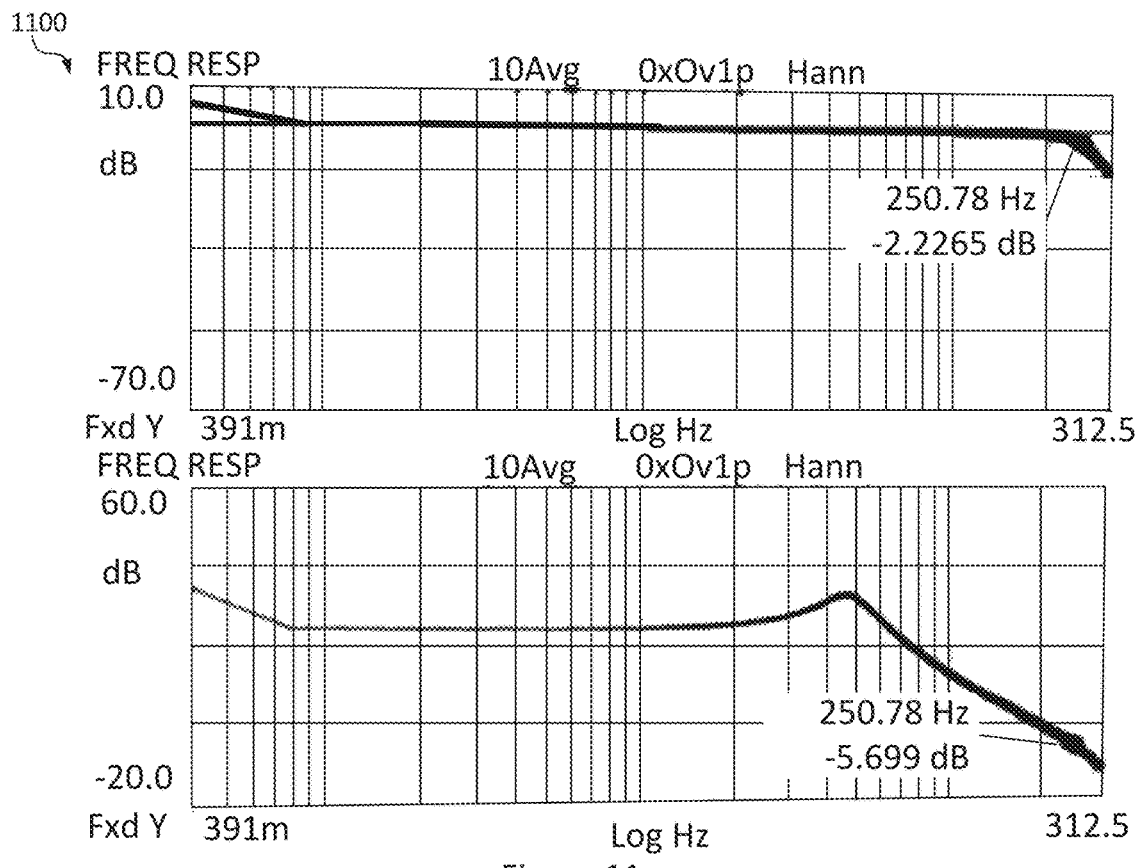
FIGS. 11 and 12 are frequency response plots comparing a response according to a preferred embodiment of the disclosure to a prior art system.

Referring to FIG. 11, a graph 1100 of two plots is shown. The upper plot shows the response of the infrasound detector of the present embodiment. The lower plot shows the response of an open loop prior art infrasound detector 100. In both plots, the infrasound detectors are open to outside pressure. In these example plots, there is no pressure chamber attached to either infrasound detector.

The lower plot (for an open loop prior art infrasound detector 100) shows undamped natural resonance of the diaphragm and force transducer at approximately 45 Hz. The upper plot shows a flat response from DC to 250 Hz (the −3 Decibel (dB) point). This response can be modified by changing the stable passive electronic components of the system such as resistors and capacitors.

Figure 12:
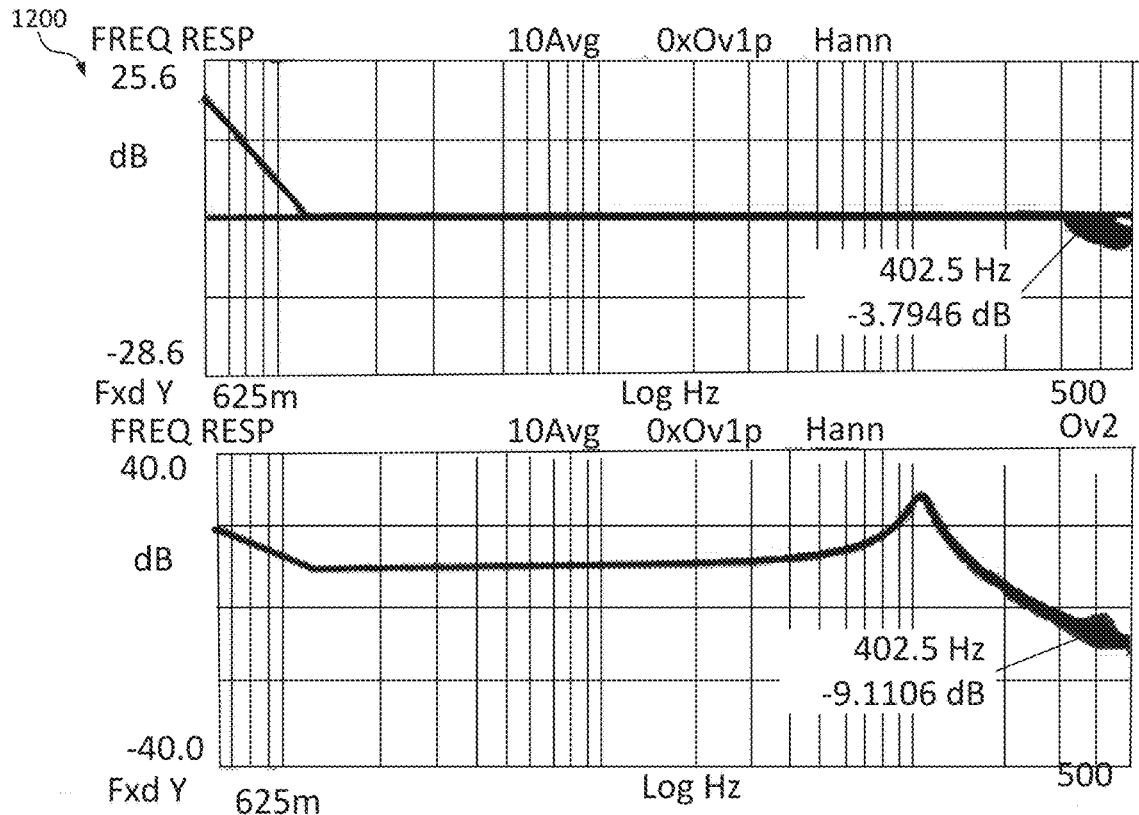

Referring to FIG. 12, a graph 1200 of two plots is shown. The upper plot shows the response of the infrasound detector of the present embodiment. Unlike the embodiment of FIG. 11 here one side of the feedback force transducer is in a pressure sealed housing, while the other side of the feedback force transducer is open to the atmosphere. The lower plot shows the response of an open loop prior art infrasound detector 100.

The upper plot shows the desirable flat feedback response of the infrasound detector of the present embodiment from DC to 400 Hz. The lower plot shows the poor feedback response of the open loop prior art infrasound detector 100.

Referring to FIG. 12, a graph 1200 of two plots is shown. The upper plot shows the response of the infrasound detector of the present embodiment. The lower plot shows the response of an open loop prior art infrasound detector 100. In both plots, the one side of the mechanical mechanisms and force transducers of the infrasound detectors are enclosed in a pressure sealed housing.

Figure 13:
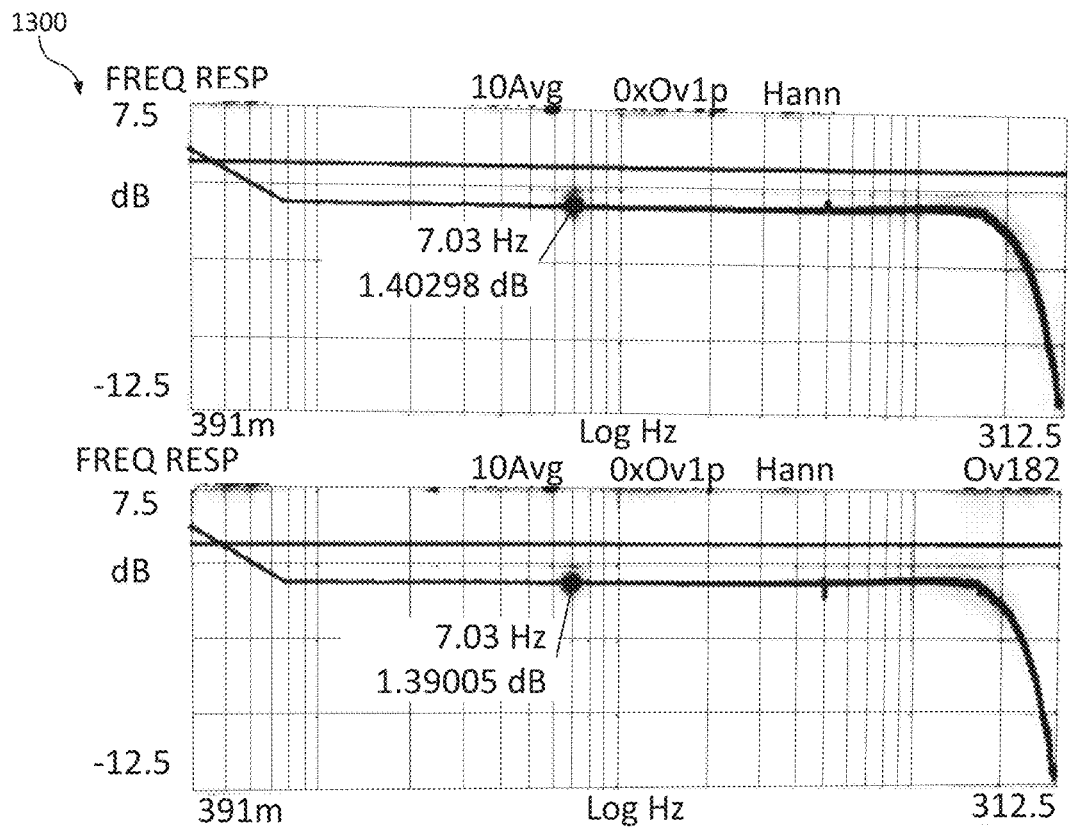
FIG. 13 is a frequency response plot comparing a response at one temperature to another according to a preferred embodiment of the disclosure.

Referring to FIG. 13, a graph 1300 shows the temperature stability of the infrasound detector of the present embodiment. The upper plot shows a first frequency response taken at an initial temperature and the lower plot shows a second frequency response taken later with a temperature change of 18 degrees Centigrade. The second frequency response was taken 12 hours after the first. The recorded frequency response consistently provides less than −60 dB gain variation over the temperature change of 18 degrees Centigrade and over a period of 12 hours. The −60 dB gain variation is achieved using resistors with ±0.01% tolerance and ±2 ppm/° C. (parts per million per degree Centigrade) temperatures coefficient resistance (TRC) resistors and matched capacitors.

Figure 14:
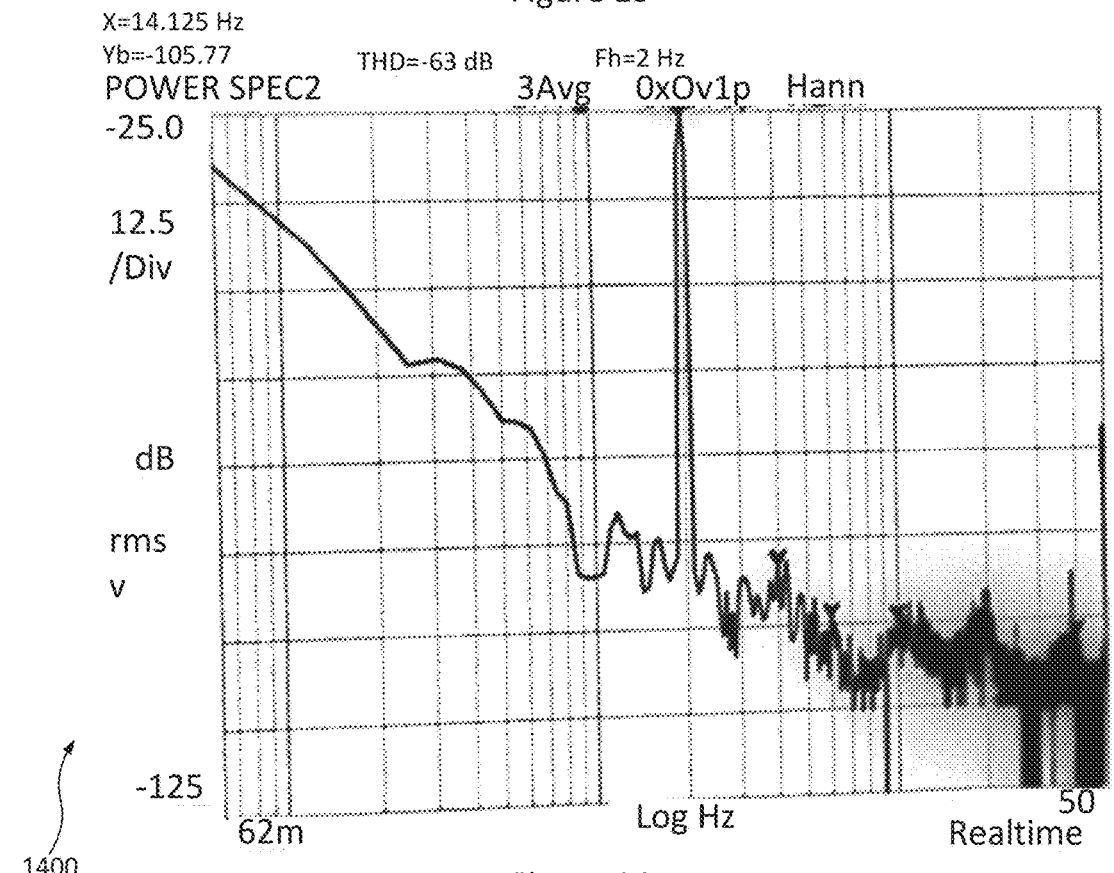
FIG. 14 is a frequency response plot according to a preferred embodiment of the disclosure.

Referring to FIG. 14, a graph 1400 of total harmonic distortion (THD) of the infrasound detector of the present embodiment is shown. Total harmonic distortion is a way to show or measure the linearity of the system. A sinusoidal signal of 2 Hz is injected into the system. The power spectral density of the infrasound detector has hardly any distortion components at harmonics of the 2 Hz injected signal. The present infrasound detector THD performance measurement is −63 dB.

The infrasound detectors 200, 300, 400, 500, 550, 600, 700 described herein provide comprehensive improvements on every aspect of prior art infrasound detectors 100 ultimately providing better detection of atmospheric perturbations and improved accuracy of detection of location of nuclear explosions.

The use of passive electronic components in the infrasound detectors 200, 300, 400, 500, 550, 600, 700 described herein provides increased stability and accuracy compared with the unstable mechanical components of open loop systems found in prior art infrasound detectors 100.

The frequency response of the infrasound detectors 200, 300, 400, 500, 550, 600, 700 described herein can be extended to high frequencies including 300 Hz or above. With the extended upper cut-off frequency, the infrasound detectors 200, 300, 400, 500, 550, 600, 700 described herein can monitor other man made infrasonic events such as conventional explosions or sonic compression events caused by planes, Unmanned Aerial Vehicles (UAVs) and other supersonic vehicles.

The infrasound detectors 200, 300, 400, 500, 550, 600, 700 described herein are reduced in size in comparison with prior art infrasound detectors 100.

The system response of the infrasound detectors 200, 300, 400, 500, 550, 600, 700 described herein is linearized.

The infrasound detectors 200, 300, 400, 500, 550, 600, 700 described herein have reduced inherent instrument noise, especially in the low frequency, flicker noise region.

The response of the infrasound detectors 200, 300, 400, 500, 550 described herein are accurately extended at both lower frequencies and higher frequencies without resorting to more than one infrasound detector to cover the broadband frequency response requirements.

The infrasound detectors 200, 300, 400, 500, 550, 600, 700 described herein have an increased operating dynamic range.

The infrasound detectors 200, 300, 400, 500, 550, 600, 700 described herein have reduced the sensitivity of the detector to seismic signals and to temperature variations. This is achieved by subtracting the output of an isolated system from one that is not isolated from atmospheric variations. Seismic signals are unwanted signals and interfere with the pressure variations the infrasound detector 200, 300, 400, 500, 550, 600, 700 is measuring. Seismic signals introduce error in calculation the location of the event and size of the explosion.

The infrasound detectors 200, 300, 400, 500, 550, 600, 700 described herein are cheaper than a prior art infrasound detector 100 allowing for more infrasound detectors to be used in an array for the same cost. The greater number of infrasound detectors 200, 300, 400, 500, 550, 600, 700 improves the detection capabilities of illicit nuclear explosions.

The calibrations system 302 of the infrasound detector 300 allows for in-situ calibration. This is an improvement over prior art infrasound detectors 100 that require calibration in a laboratory with specialised equipment.

The described embodiments of the invention are only examples of how the invention may be implemented. Modifications, variations and changes to the described embodiments will occur to those having appropriate skills and knowledge. These modifications, variations and changes may be made without departure from the scope of the claims.

Reference numerals appearing in the claims are by way of illustration only and shall have no limiting effect on the scope of the claims.

The invention claimed is:

1. An infrasound detector comprising:
    a housing holding an infrasound transducer and holding a feedback force transducer relative to the infrasound transducer for inputting a feedback force signal from the feedback force transducer to the infrasound transducer, wherein:
        the infrasound transducer is configured to transduce an infrasound signal to an electrical signal;
        the feedback force transducer is configured to transduce a negative feedback electrical signal to a feedback force signal:
    a signal feedback path is arranged to feed a negative feedback signal from the infrasound transducer to the feedback force transducer, the signal feedback path comprising a signal inverter arranged to invert the electrical signal from the infrasound transducer, with the negative feedback signal based on the inverted electrical signal from the infrasound transducer;
    wherein the infrasound detector is adapted for detection of ambient infrasound below 20 Hz outside the housing, and provides as outputs one or more electrical signals indicative of the infrasound signal.

2. An infrasound detector according to claim 1, wherein the feedback electrical signal is adapted in the signal feedback path such that the feedback force signal opposes the infrasound signal.

3. An infrasound detector according to claim 1, wherein the feedback electrical signal is adapted in the signal feedback path such that the feedback force signal matches the infrasound signal in amplitude and is phase shifted by 180°.

4. An infrasound detector according to claim 1, wherein the signal feedback path comprises one or more of the following:
    a feedback signal amplifier;
    a feedback signal phase sensitive detector;
    a feedback signal dominant pole compensator;
    an analogue to digital converter and/or a digital to analogue converter;
    a voltage to current converter;
    an integrator;
    a proportional integrator;
    a low pass filter;
    a bandpass filter;
    a biquadratic filter; and
    one or more parallel feedback paths.

5. An infrasound detector according to claim 1, further adapted to provide as outputs a first derivative of the infrasound signal, and/or a second derivative of the infrasound signal.

6. An infrasound detector according to claim 1, further comprising a calibration signal path arranged to feed a calibration signal to the feedback force transducer.

7. An infrasound detector according to claim 1, comprising a coupling arranged to provide a feedback force from the feedback force transducer to the infrasound transducer.

8. An infrasound detector according to claim 7, wherein the coupling is stiff relative to the force characteristics of the infrasound transducer and the feedback force transducer.

9. An infrasound detector according to claim 1, further comprising a suspension unit for arranging the infrasound transducer and the feedback force transducer relative to one another, the suspension unit comprising a spring and/or a damper for arranging the infrasound transducer and the feedback force transducer relative to one another.

10. An infrasound detector according to claim 9, further comprising an adjustment unit configured to adjust the suspension unit and/or the arrangement of the infrasound transducer and the feedback force transducer relative to one another.

11. An infrasound detector according to claim 1, further comprising an adjustment unit configured to adjust a force urging the infrasound transducer and the feedback force transducer relative toward or away from one another.

12. An infrasound detector according to claim 11, wherein the adjustment unit is arranged to adjust the positions of the infrasound transducer and the feedback force transducer relative to one another.

13. An infrasound detector according to claim 1, wherein the feedback force transducer is at least partially in a pressure sealed housing.

14. An infrasound detector according to claim 1, wherein the feedback force transducer is a speaker, a diaphragm displacement transducer with a magnet and coil, a capacitance force transducer, or a piezo-electric force transducer.

15. An infrasound detector according to claim 1, wherein the infrasound transducer comprises a capacitive displacement transducer, a linear variable displacement transducer, or a displacement transducer with an optical sensor, a compliant diaphragm, a corrugated diaphragm, a bellow, and/or a stretched diaphragm of compliant material.

16. An infrasound detector according to claim 1 for measurement of infrasound and near-infrasound and/or low audible sound in a range of up to 200 Hz.

17. An array of infrasound detectors according to claim 1.

* * * * *